(12) United States Patent
Sun et al.

(10) Patent No.: US 12,052,718 B2
(45) Date of Patent: *Jul. 30, 2024

(54) FREQUENCY RESOURCE MAPPING FOR PHYSICAL UPLINK CONTROL CHANNEL/ACKNOWLEDGEMENT (PUCCH/ACK) AND AUTONOMOUS UPLINK (AUL) IN NEW RADIO- UNLICENSED (NR-U)

(71) Applicant: QUALCOMM INCORPORATED, San Diego, CA (US)

(72) Inventors: Jing Sun, San Diego, CA (US); Xiaoxia Zhang, San Diego, CA (US); Ananta Narayanan Thyagarajan, Bangalore (IN); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/446,447

(22) Filed: Aug. 30, 2021

(65) Prior Publication Data

US 2021/0392638 A1  Dec. 16, 2021

Related U.S. Application Data

(63) Continuation of application No. 16/696,213, filed on Nov. 26, 2019, now Pat. No. 11,109,366.

(30) Foreign Application Priority Data

Nov. 28, 2018  (IN) .............................. 201841044911

(51) Int. Cl.
*H04W 4/00*  (2018.01)
*H04L 5/00*  (2006.01)
(Continued)

(52) U.S. Cl.
CPC .......... *H04W 72/21* (2023.01); *H04L 5/0055* (2013.01); *H04W 72/0453* (2013.01); *H04W 72/23* (2023.01); *H04W 74/0808* (2013.01)

(58) Field of Classification Search
None
See application file for complete search history.

(56) References Cited

U.S. PATENT DOCUMENTS 10,536,960 B2  1/2020 Park et al.
11,109,366 B2 * 8/2021 Sun ........................ H04L 5/0055
(Continued)

FOREIGN PATENT DOCUMENTS

WO  2017180179 A1  10/2017
WO  2018128493 A1  7/2018
(Continued)

OTHER PUBLICATIONS

Huawei, et al., "UCI Transmission in NR Operations in Unlicensed," 3GPP Draft, 3GPP TSG RAN WG1 Meeting #92bis, R1-1803682, 3RD Generation Partnership Project (3GPP), Mobile Competence Centre, 650, Route Des Lucioles, F-06921, Sophia-Antipolis Cedex, France, vol. RAN WG1, No. Sanya, China; Apr. 16, 2018-Apr. 20, 2018, Apr. 6, 2018 (Apr. 6, 2018), XP051412960, 6 pages, Retrieved from the Internet: URL: http://www.3gpp.org/ftp/tsg%5Fran/WG1%5FRL1/TSGR1%5F92b/Docs/ [retrieved on Apr. 6, 2018] paragraphs [002.], [004.].

(Continued)

*Primary Examiner* — Clemence S Han
(74) *Attorney, Agent, or Firm* — Haynes and Boone, LLP

(57) ABSTRACT

Wireless communications systems and methods related to frequency resource mapping for uplink control channel communications and autonomous uplink communications in a frequency spectrum shared by multiple network operating entities are provided. A first wireless communication device
(Continued)

can communicate with a second wireless communication device a configuration for a plurality of autonomous uplink (AUL) resources in a plurality of subbands and a priority order associated with the plurality of AUL resources. The first wireless communication device can communicate with the second wireless communication device an AUL communication signal using a first AUL resource of the plurality of AUL resources based at least in part on the priority order.

24 Claims, 20 Drawing Sheets

(51) Int. Cl.
*H04W 72/0453* (2023.01)
*H04W 72/21* (2023.01)
*H04W 72/23* (2023.01)
*H04W 74/0808* (2024.01)

(56) References Cited

U.S. PATENT DOCUMENTS

| | | | | |
|---|---|---|---|---|
| 2009/0175161 A1* | 7/2009 | Yi | .................. | H04W 74/085 370/328 |
| 2009/0175220 A1* | 7/2009 | Yi | .................. | H04W 52/48 370/328 |
| 2013/0188590 A1* | 7/2013 | Aiba | .................. | H04L 1/1861 370/329 |
| 2016/0065289 A1* | 3/2016 | Zhao | .................. | H04L 1/0031 375/267 |
| 2017/0048049 A1* | 2/2017 | Park | .................. | H04W 72/042 |
| 2017/0374656 A1* | 12/2017 | Kim | .................. | H04L 1/1854 |
| 2018/0262304 A1* | 9/2018 | Wang | .................. | H04W 72/1289 |
| 2019/0036653 A1* | 1/2019 | Lunttila | .................. | H04W 76/27 |
| 2019/0159256 A1* | 5/2019 | Talarico | .................. | H04L 1/187 |
| 2019/0230685 A1* | 7/2019 | Park | .................. | H04W 72/1263 |
| 2019/0261210 A1* | 8/2019 | Tian | .................. | H04W 16/14 |
| 2020/0052865 A1* | 2/2020 | Liou | .................. | H04W 72/1289 |
| 2020/0146058 A1* | 5/2020 | Xu | .................. | H04B 7/0639 |
| 2021/0007084 A1* | 1/2021 | Jiang | .................. | H04L 5/0091 |

FOREIGN PATENT DOCUMENTS

| | | |
|---|---|---|
| WO | 2018175547 A1 | 9/2018 |
| WO | 2019158041 A1 | 8/2019 |
| WO | 2019216607 A1 | 11/2019 |

OTHER PUBLICATIONS

International Search Report and Written Opinion-PCT/US2019/063385-ISA/EPO-Mar. 3, 2020.

* cited by examiner

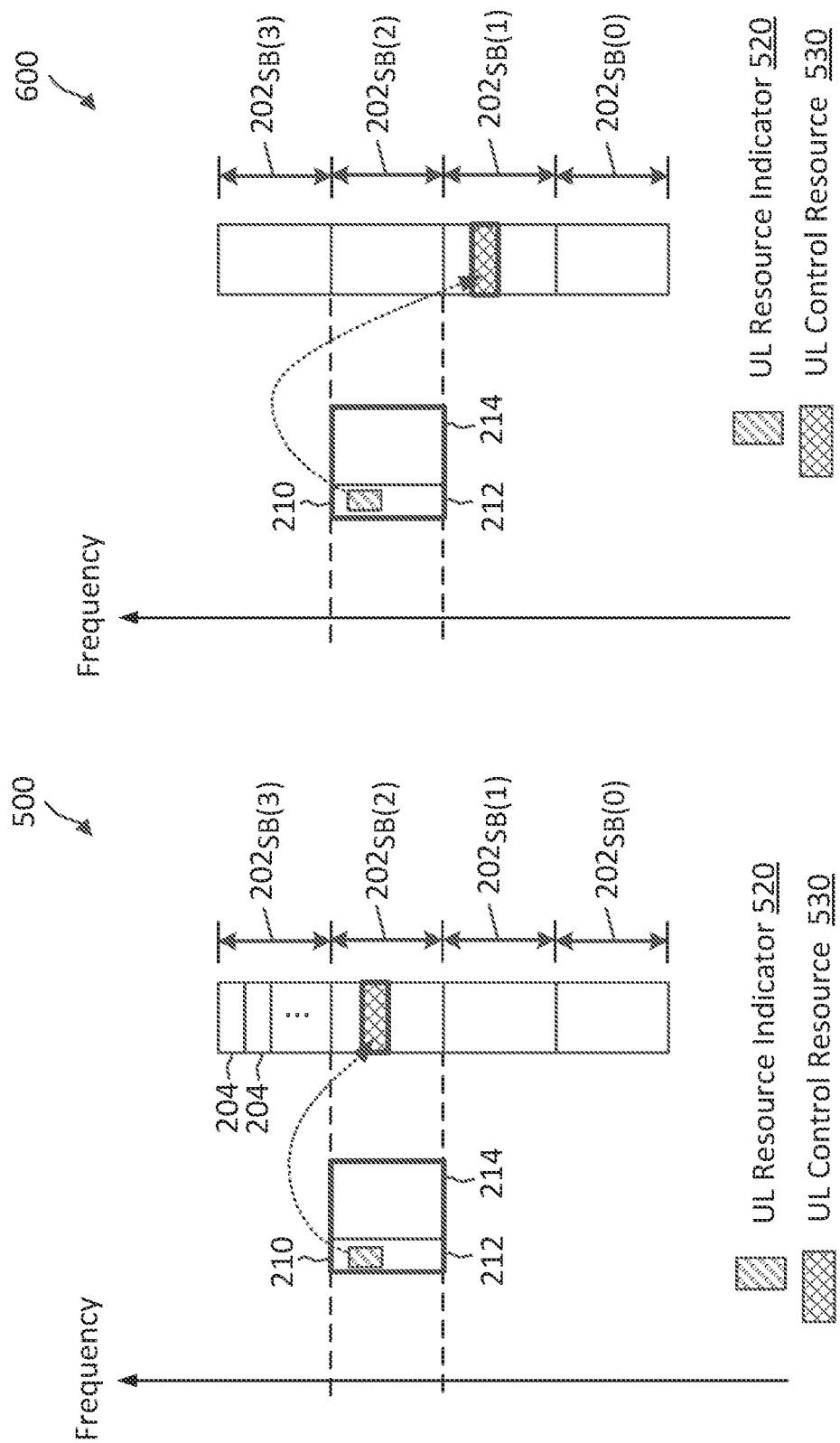

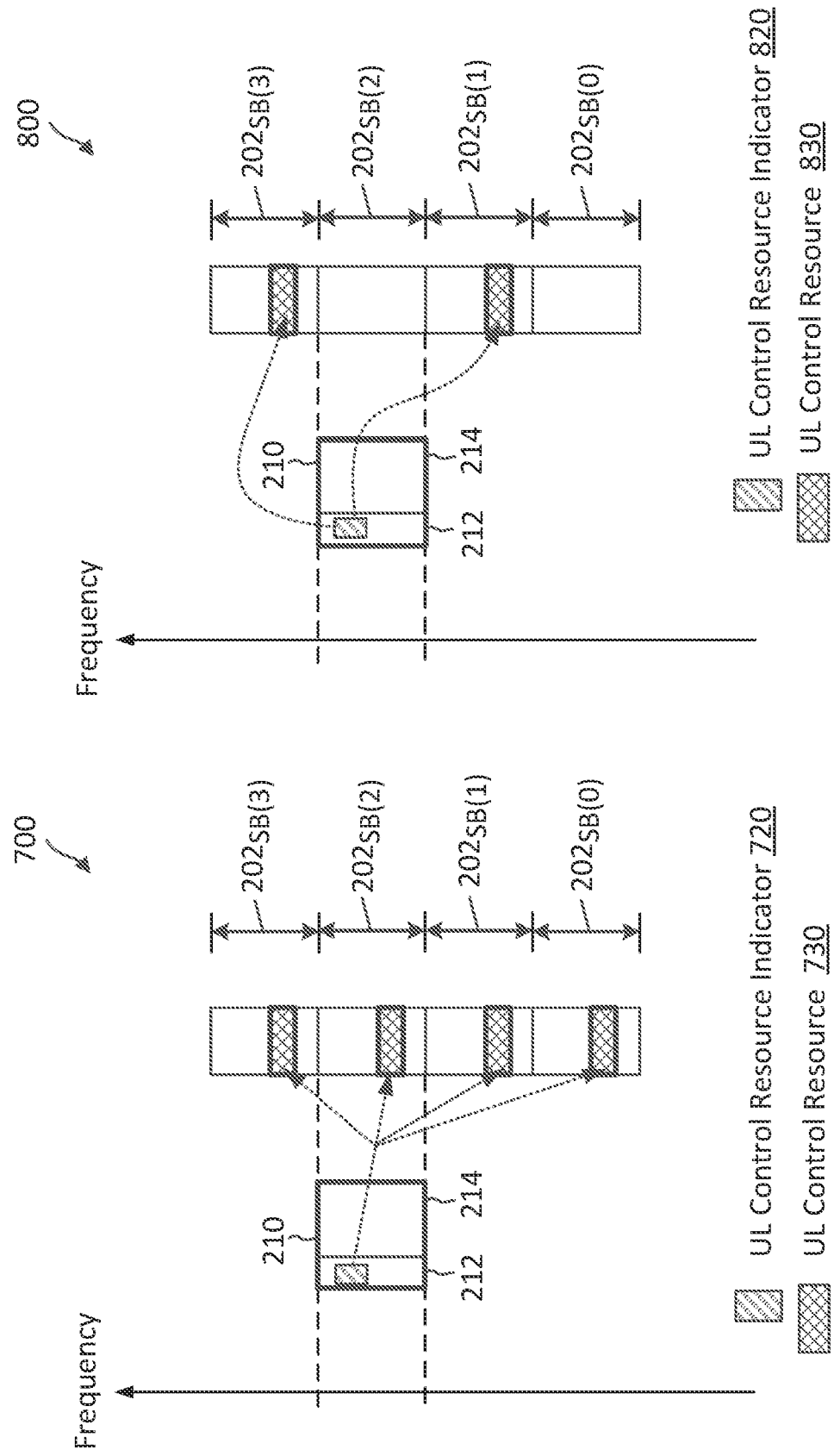

FREQUENCY RESOURCE MAPPING FOR PHYSICAL UPLINK CONTROL CHANNEL/ACKNOWLEDGEMENT (PUCCH/ACK) AND AUTONOMOUS UPLINK (AUL) IN NEW RADIO- UNLICENSED (NR-U)

CROSS REFERENCE TO RELATED APPLICATIONS

The present application is a continuation of U.S. patent application Ser. No. 16/696,213, filed Nov. 26, 2019, now U.S. Pat. No. 11,109,366, which claims priority to and the benefit of Indian Provisional Patent Application No. 201841044911, filed Nov. 28, 2018, each of which is hereby incorporated by reference in its entirety as if fully set forth below and for all applicable purposes.

TECHNICAL FIELD

This application relates to wireless communication systems, and more particularly to frequency resource mapping for uplink control channel communications and autonomous uplink communications in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an uplink (UL) transmission over an unlicensed frequency band in a certain time period and the UE may perform an LBT prior to the scheduled time period. In addition, a BS may preconfigure a UE with certain resource for autonomous uplink (AUL) communications. AUL communications are grantless UL transmissions, where a UE may transmit UL data to a BS without being scheduled by the BS. When the UE has AUL data ready, the UE may perform an LBT prior to transmitting the AUL data using the preconfigured AUL resources. However, depending on the outcome of the UE's LBT, the UE may or may not be able to transmit according to the scheduled time period or using the preconfigured AUL resources.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, including identifying, by a first wireless communication device, a first configuration from a plurality of configurations for mapping an uplink resource indicator to resources in a plurality of subbands; communicating, by the first wireless communication device with a second wireless communication device, a subband priority configuration; communicating, by the first wireless communication device with the second wireless communication device, the uplink resource indicator; and communicating, by the first wireless communication device with the second wireless communication device, an uplink communication signal using a first resource of the resources based on the uplink resource indicator, the subband priority configuration, and the first configuration.

In an additional aspect of the disclosure, a method of wireless communication, including communicating, by a first wireless communication device with a second wireless communication device, a configuration for a plurality of autonomous uplink (AUL) resources in a plurality of subbands and a priority order associated with the plurality of AUL resources; and communicating, by the first wireless communication device with the second wireless communication device, an AUL communication signal using a first AUL resource of the plurality of AUL resources based at least in part on the priority order.

In an additional aspect of the disclosure, an apparatus including a processor configured to identify a first configuration from a plurality of configurations for mapping an uplink resource indicator to resources in a plurality of subbands; and a transceiver configured to communicate, with a wireless communication device, a subband priority configuration; communicate, with the wireless communication device, the uplink resource indicator; and communicate, with the wireless communication device, an uplink communication signal using a first resource of the resources based on the uplink resource indicator, the subband priority configuration, and the first configuration.

In an additional aspect of the disclosure, an apparatus including a transceiver configured to communicate, with a wireless communication device, a configuration for a plurality of autonomous uplink (AUL) resources in a plurality of subbands and a priority order associated with the plurality of AUL resources; and communicate, with the wireless communication device, an AUL communication signal using a first AUL resource of the plurality of AUL resources based at least in part on the priority order.

In an additional aspect of the disclosure, a computer-readable medium having program code recorded thereon, the program code including code for causing a first wireless communication device to identify a first configuration from a plurality of configurations for mapping an uplink resource indicator to resources in a plurality of subbands; code for causing the first wireless communication device to communicate, with a second wireless communication device, a subband priority configuration; code for causing the first wireless communication device to communicate, with the second wireless communication device, the uplink resource indicator; and code for causing the first wireless communication device to communicate, with the second wireless communication device, an uplink communication signal using a first resource of the resources based on the uplink resource indicator, the subband priority configuration, and the first configuration.

In an additional aspect of the disclosure, a computer-readable medium having program code recorded thereon, the program code including code for causing a first wireless communication device to communicate, with a second wireless communication device, a configuration for a plurality of autonomous uplink (AUL) resources in a plurality of subbands and a priority order associated with the plurality of AUL resources; and code for causing the first wireless communication device to communicate, with the second wireless communication device, an AUL communication signal using a first AUL resource of the plurality of AUL resources based at least in part on the priority order.

In an additional aspect of the disclosure, an apparatus including means for identifying a first configuration from a plurality of configurations for mapping an uplink resource indicator to resources in a plurality of subbands; means for communicating, with a wireless communication device, a subband priority configuration; means for communicating, with the wireless communication device, the uplink resource indicator; and means for communicating, with the wireless communication device, an uplink communication signal using a first resource of the resources based on the uplink resource indicator, the subband priority configuration, and the first configuration.

In an additional aspect of the disclosure, an apparatus including means for communicating, with a wireless communication device, a configuration for a plurality of autonomous uplink (AUL) resources in a plurality of subbands and a priority order associated with the plurality of AUL resources; and means for communicating, with the wireless communication device, an AUL communication signal using a first AUL resource of the plurality of AUL resources based at least in part on the priority order.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5 illustrates a UL control resource indicator mapping scheme according to some embodiments of the present disclosure.

FIG. 6 illustrates a UL control resource indicator mapping scheme according to some embodiments of the present disclosure.

FIG. 7 illustrates a UL control resource indicator mapping scheme according to some embodiments of the present disclosure.

FIG. 8 illustrates a UL control resource indicator mapping scheme according to some embodiments of the present disclosure.

DETAILED DESCRIPTION

Figure 1:
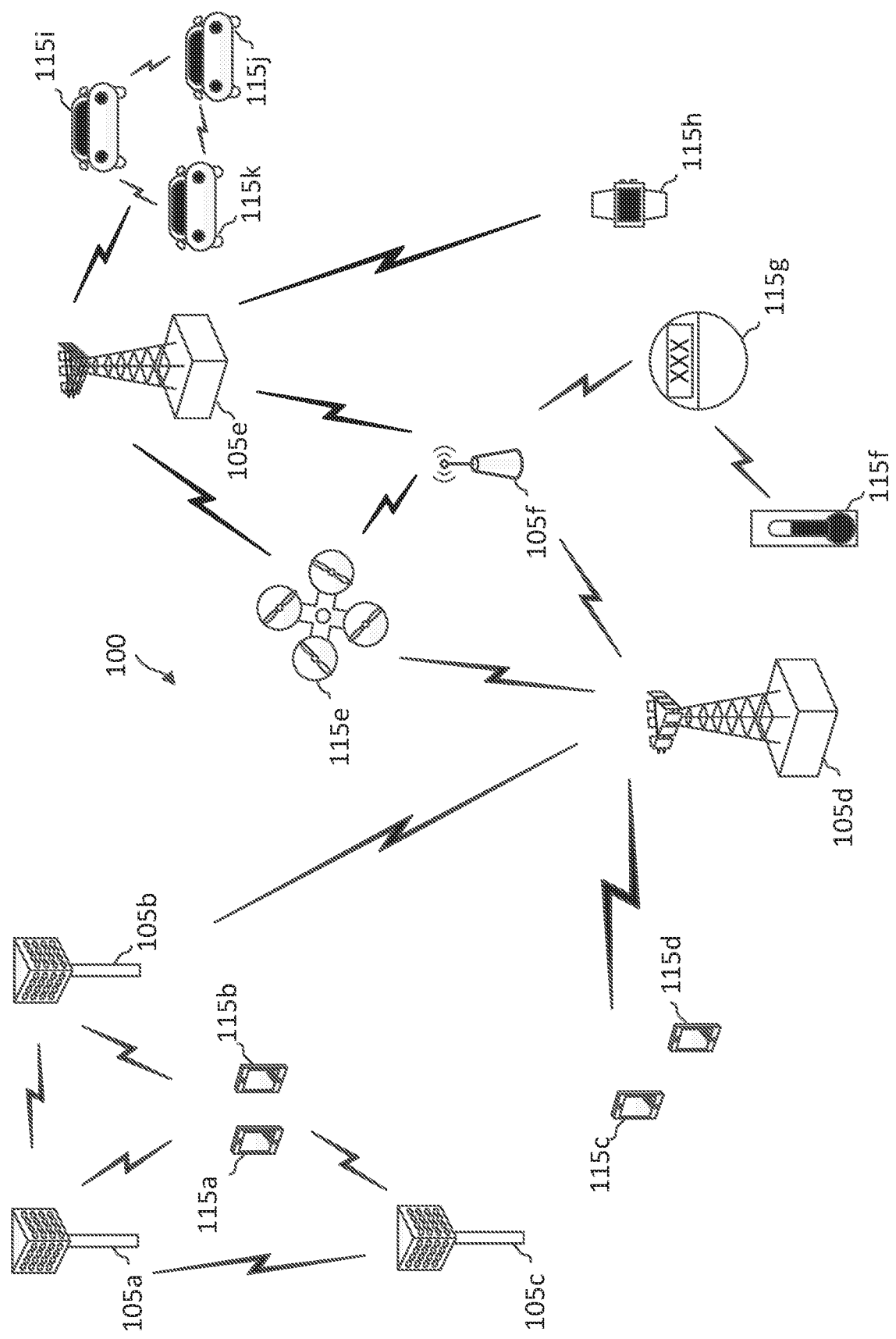
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for configuring multiple frequency resources for UL control channel communications and/or autonomous uplink (AUL) communications in a shared spectrum or an unlicensed spectrum shared by multiple network operating entities. UL control channel communications may include scheduling requests (SRs), hybrid automatic repeat request (HARQ) acknowledgements/not-acknowledgements (ACK/NACKs), and/or channel quality indicators (CQIs). The disclosed embodiments partition a system bandwidth into multiple subbands or frequency channels and configure multiple frequency resources in different subbands for UL control channel communications and/or AUL communications. The provision of the multiple frequency resources provides UEs with an increase number of transmission opportunities. The configuration of the multiple resources in multiple subbands allows a UE to perform LBT per subband, and thus may increase the LBT success rates.

For UL control channel communications, a BS may allocate one or more frequency resources, each in a different subband for UL control transmissions and may indicate a scheduled UL control resource using various mapping schemes. The BS may configure a UE with multiple configurations for mapping a UL control resource indicator (e.g., including a set of bits) to a subband or a resource within a subband. The BS may indicate a UL control resource indicator dynamically via a downlink control information (DCI). The BS may semi-statically configure certain subbands via a radio resource control (RRC) configuration and indicate a particular resource within the configured subbands dynamically via DCI. The BS may configure a UE with rules and/or conditions direct a UE in selecting a particular mapping for interpreting a UL control resource indicator. The rules and/or conditions may include whether a UL control channel signal is to be communicated within a transmission opportunity (TXOP) of a BS or outside a TXOP of the BS, whether a UL control channel signal is to be communicated within a TXOP of the BS in a subband acquired by the BS or in a subband not acquired by the BS, and/or a subband priority. The UE may select a mapping, apply the mapping to a UL control resource indicator received from the BS, and/or select a resource for a UL control channel transmission based on the rules and/or conditions configured by the BS.

For AUL communications, a BS may configure a UE with multiple AUL resources in different subbands and may configure a priority order for the AUL resources. The priority order can be UE specific. The priority order may also change over time, for example, depending on channel conditions and/or traffic loading in the subbands corresponding to the AUL resources. The BS may configure the UE with various configurations for selecting an AUL resources from the multiple preconfigured AUL resources. For AUL transmissions outside a TXOP of the BS, a UE may select an AUL resource based on LBT and the predetermined priority order. For AUL transmissions within a TXOP of the BS, a UE may select an AUL resource further based on whether the AUL resource is within a BS's acquired subband (e.g., with a BS's LBT pass) or a subband not acquired by the BS (e.g., with a BS's LBT fail). The BS may also configure the UE with one or more set of allowable starting time offsets for the AUL resources. The BS may configure the UE with rules and/or conditions for selecting a starting time offset for an AUL transmission. The rules and/or conditions may include whether an AUL signal is to be communicated within a TXOP of a BS or outside a TXOP of the BS, whether an AUL signal is to be communicated within a TXOP of the BS in a subband acquired by the BS or in a subband not acquired by the BS. The UE may select an AUL resource based on the configuration.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (HD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes, the BS 105 may schedule a UE 115 for UL and/or DL communications over the shared channel. As described above, the UE 115 is required to perform an LBT prior a UL transmission. However, the UE 115 may or may not be able to transmit according to a scheduled time depending on the outcome of the LBT. Thus, the BS 105 may allocate multiple redundant resources in a time domain and/or a frequency domain to provide the UE 115 with a greater number of transmission opportunities.

In an embodiment, the BS 105 may allocate redundant resources in a frequency domain. The BS 105 may allocate the redundant resources in different subbands. The redundant allocations in different subbands allow a UE 115 to perform LBT independently in each subband and transmit in the subband which passes an LBT. Thus, the performing of the LBT independently in each subband can increase the success probability. Mechanisms for allocating redundant frequency resources and mapping of resource indicator to the redundant frequency resources are described in greater detail herein.

Figure 2:
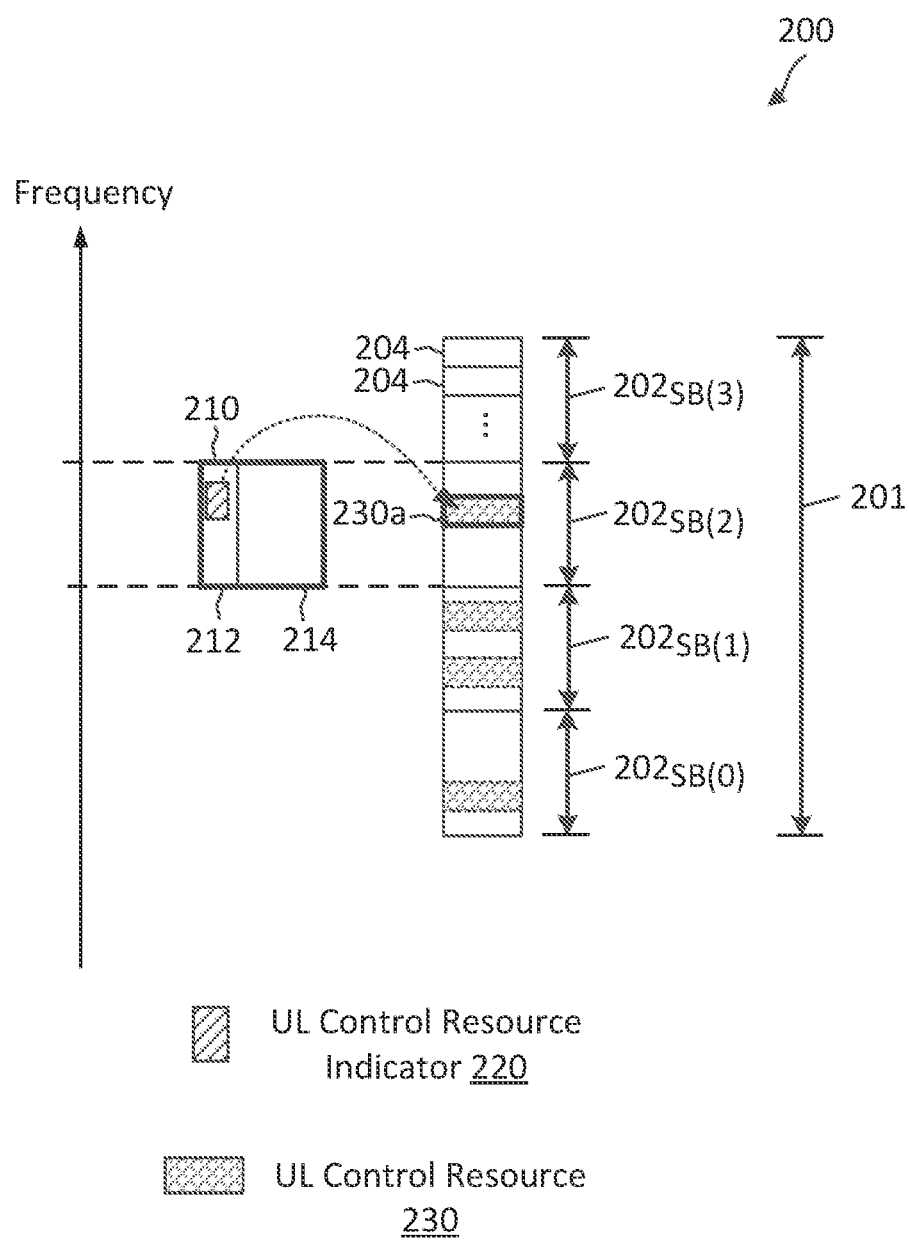
FIG. 2 illustrates an uplink (UL) control resource indicator mapping scheme according to some embodiments of the present disclosure.

FIG. 2 illustrates a UL control resource indicator mapping scheme 200 according to some embodiments of the present disclosure. The scheme 200 may be employed by a BS such as the BSs 105 and a UE such as the UEs 115 in a network such as the network 100. In particular, a BS may employ the scheme 200 to allocate redundant frequency resources for UL control information transmissions over a shared frequency band or an unlicensed frequency band and communicate a UL control resource indicator with a UE. In FIG. 2, the y-axis represents frequency in some constant units. FIG. 2 illustrates a frequency band 201 partitions into four subbands 202 (individually labeled as $202_{SB(0)}$, $202_{SB(2)}$, $202_{SB(2)}$, and $202_{SB(3)}$) for purposes of simplicity of discussion, though it will be recognized that embodiments of the present disclosure may scale to partition the frequency band 201 into any suitable number of subbands 202 (e.g., about 2, 3, 5, 6, or more). The frequency band 201 may include any suitable frequency ranges, for example, in a sub-6 gigahertz (GHz) range or in a mmWav frequency range. The frequency band 201 may be located within a shared spectrum or an unlicensed spectrum. The frequency band 201 may correspond to a full system bandwidth of the network. Each subband 202 may include a plurality of frequency subcarriers or resource elements (REs) 204. Each subband 202 may include the same number of REs 204 or a different number of REs 204.

In the scheme 200, a BS may allocate a plurality of UL control resources 230 in different subbands 202 for UL control information transmission. Each UL control resource 230 may include one or more REs 204 in frequency and one or more symbols in time. Examples of UL control information may include hybrid automatic repeat request (HARQ) acknowledgement/not-acknowledgement (ACK/NAK), channel quality indicator (CQI), and scheduling request (SR).

In an embodiment, the UL control resources 230 may be predefined or semi-statically preconfigured by a radio resource control message (RRC). The BS may configure the UE with the predefined UL control resources 230. The BS may schedule a UE to transmit a UL control signal in one of the predefined UL control resources 230. The scheduled UL control resource is shown as 230a located in the subband $202_{SB(2)}$. The BS may transmit a DL communication signal 210 including a control portion 212 and a DL data portion 214. The BS may include a UL control resource indicator 220 in the control portion 212. The UL control resource indicator 220 indicates the UL control resource 230a scheduled for the UE. In the context of NR and/or LTE, the control portion 212 may be referred to as a PDCCH, the DL data portion 214 may be referred to as a PDSCH, and the UL control resource indicator 220 may be carried in a downlink control information (DCI) message. While FIG. 2 illustrates that the BS transmits the UL control resource indicator 220 in the subband $202_{SB(2)}$, the BS may select any subband 202 within the system bandwidth or frequency band 201 for transmitting the UL control resource indicator 220, for example, based on LBT.

Upon receiving the UL control resource indicator 220, the UE may perform an LBT in the subband $202_{SB(2)}$ where the UL control resource 230a is located. When the LBT passes, the UE transmit UL control information using the UL control resource 230a. When the LBT fails, the UE may refrain from using the UL control resource 230a.

In an example, the frequency band 201 may include N number of subbands 202 and the BS may preconfigure K number of UL control resources 230 in K different subbands 202. The UL control resource indicator 220 may include $\log_2(K)$ bits identifying the UL control resource 230a from the K plurality of UL control resources 230.

In some embodiments, the UL control resources 230 are ACK resources designated for HARQ ACK/NACK transmissions. For example, the BS may transmit DL data to the UE using a HARQ process. When the UE successfully receives the DL data, the UE may transmit an ACK feedback to the BS. When the UE fails to receive the DL data correctly, the UE may transmit an NACK feedback to the BS and the BS may retransmit the DL data (e.g., a different code version or the same code version). In such embodiments, the UL control resource indicator 220 may be referred to as an ACK resource indicator (ARI) and the UL control resource may be referred to as an ACK resource.

Figure 3:
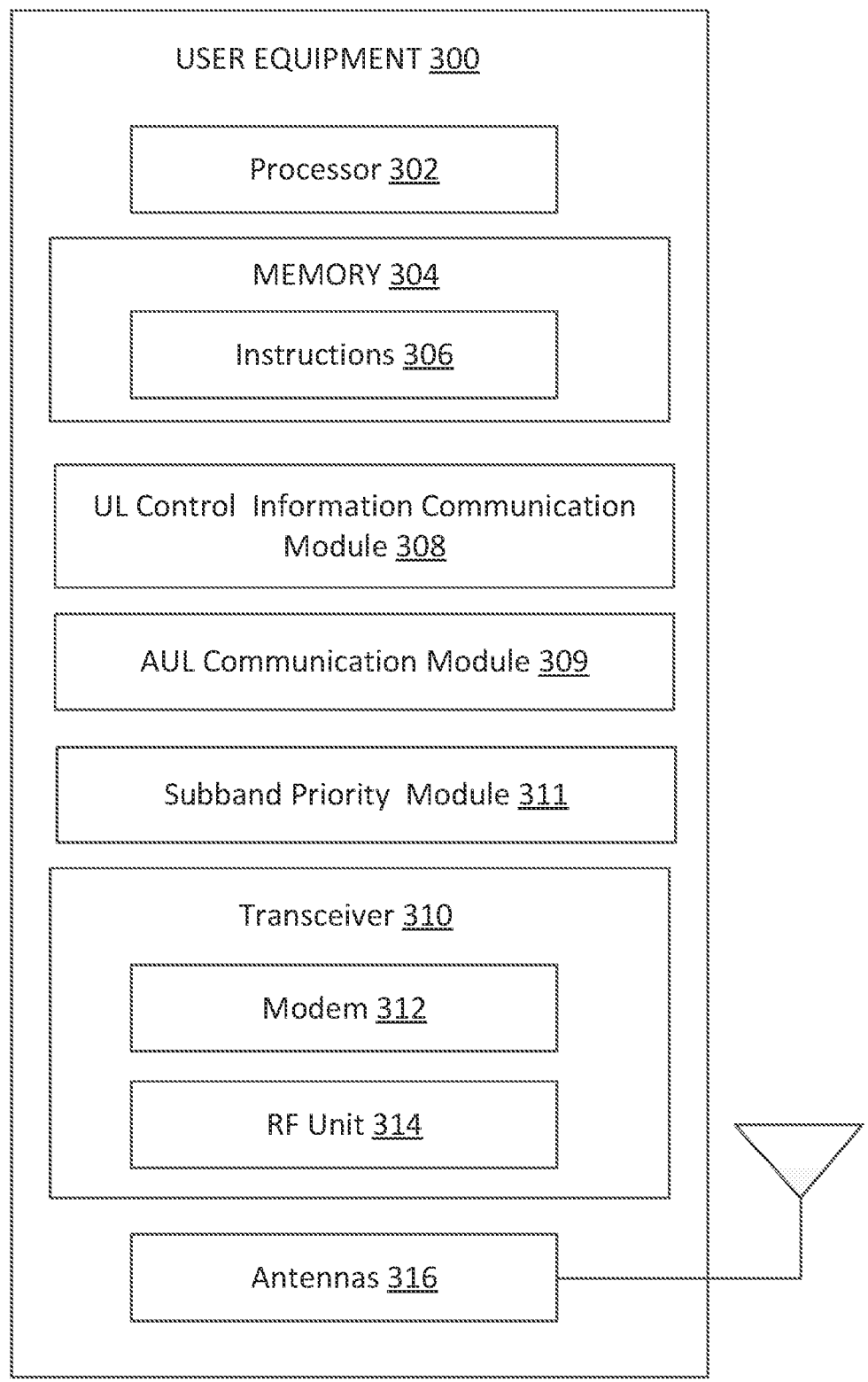
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 in the network 100 as discussed above in FIG. 1. As shown, the UE 300 may include a processor 302, a memory 304, a UL control information communication module 308, an AUL communication module 309, a subband priority module 311, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIG. 11. Instructions 306 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the UL control information communication module 308, the AUL communication module 309, and the subband priority module 311 may be implemented via hardware, software, or combinations thereof. For example, each of the UL control information communication module 308, the AUL communication module 309, and the subband priority module 311 may be implemented as a processor, circuit, and/or instructions 306 stored in the memory 304 and executed by the processor 302. In some examples, the UL control information communication module 308, the AUL communication module 309, and/or the subband priority module 311 can be integrated within the modem subsystem 312. For example, the UL control information communication module 308, the AUL communication module 309, and/or the subband priority module 311 can be implemented by a combination of software components (e.g., executed by a DSP or a general processor) and hardware components (e.g., logic gates and circuitry) within the modem subsystem 312. In some examples, a UE may include one of the UL control information communication module 308, the AUL communication module 309, or the subband priority module 311. In other examples, a UE may include the UL control information communication module 308, the AUL communication module 309, and the subband priority module 311.

The UL control information communication module 308, the AUL communication module 309, and the subband priority module 311 may be used for various aspects of the present disclosure, for example, aspects of FIGS. 5-23. For example, the UL control information communication module 308 is configured to receive multiple configurations from a BS (e.g., the BSs 105) for mapping a UL control resource indicator to a particular subband and/or a particular resource within a subband, receive a UL control resource indicator from the BS, receive rules and/or conditions for selecting a configuration from the multiple configurations, interpret or map the received UL control resource indicator to one or more frequency resources in one or more subbands, perform LBTs, select a frequency resource based on the rules, conditions, subband priority and/or LBT outcomes, and transmit a UL control channel signal to the BS using the selected resource. The rules and/or conditions may include whether a UL control channel signal is to be communicated within a TXOP of a BS or outside a TXOP of the BS, whether a UL control channel signal is to be communicated within a TXOP of the BS in a subband acquired by the BS or in a subband not acquired by the BS. The UL control information communication module 308 may use subband priority information preconfigured by the BS, to select the frequency resource. The subband priority module 311 is configures to receive semi-static preconfigured subband priority configuration information from the BS and communicate the received semi-static preconfigured subband priority configuration information with the UL control information communication module 308. In some instances, the semi-static preconfigured subband priority may be cell specific. Mechanisms for communicating UL control information using redundant frequency resources are described in greater detail herein.

The AUL communication module 309 is configured to receive a configuration from a BS indicating a plurality of AUL resource in a plurality of subbands, a priority order for the AUL resources, one or more sets of allowable starting offsets for starting an AUL transmission using the AUL resources, rules and/or conditions, perform LBTs, select an AUL resource and/or a starting time offset based on the rules and/or conditions and/or LBT outcomes, and/or transmit AUL communications to the BS using the selected resource and/or selected starting offset. The rules and/or conditions may include whether an AUL signal is to be communicated within a TXOP of a BS or outside a TXOP of the BS, whether an AUL signal is to be communicated within a TXOP of the BS in a subband acquired by the BS or in a subband not acquired by the BS. Mechanisms for communicating AUL data using redundant frequency resources are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, the UL control information communication module 308, and/or the AUL communication module 309 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

In an embodiment, the UE 300 can include multiple transceivers 310 implementing different RATs (e.g., NR and LTE). In an embodiment, the UE 300 can include a single transceiver 310 implementing multiple RATs (e.g., NR and LTE). In an embodiment, the transceiver 310 can include various components, where different combinations of components can implement RATs.

Figure 4:
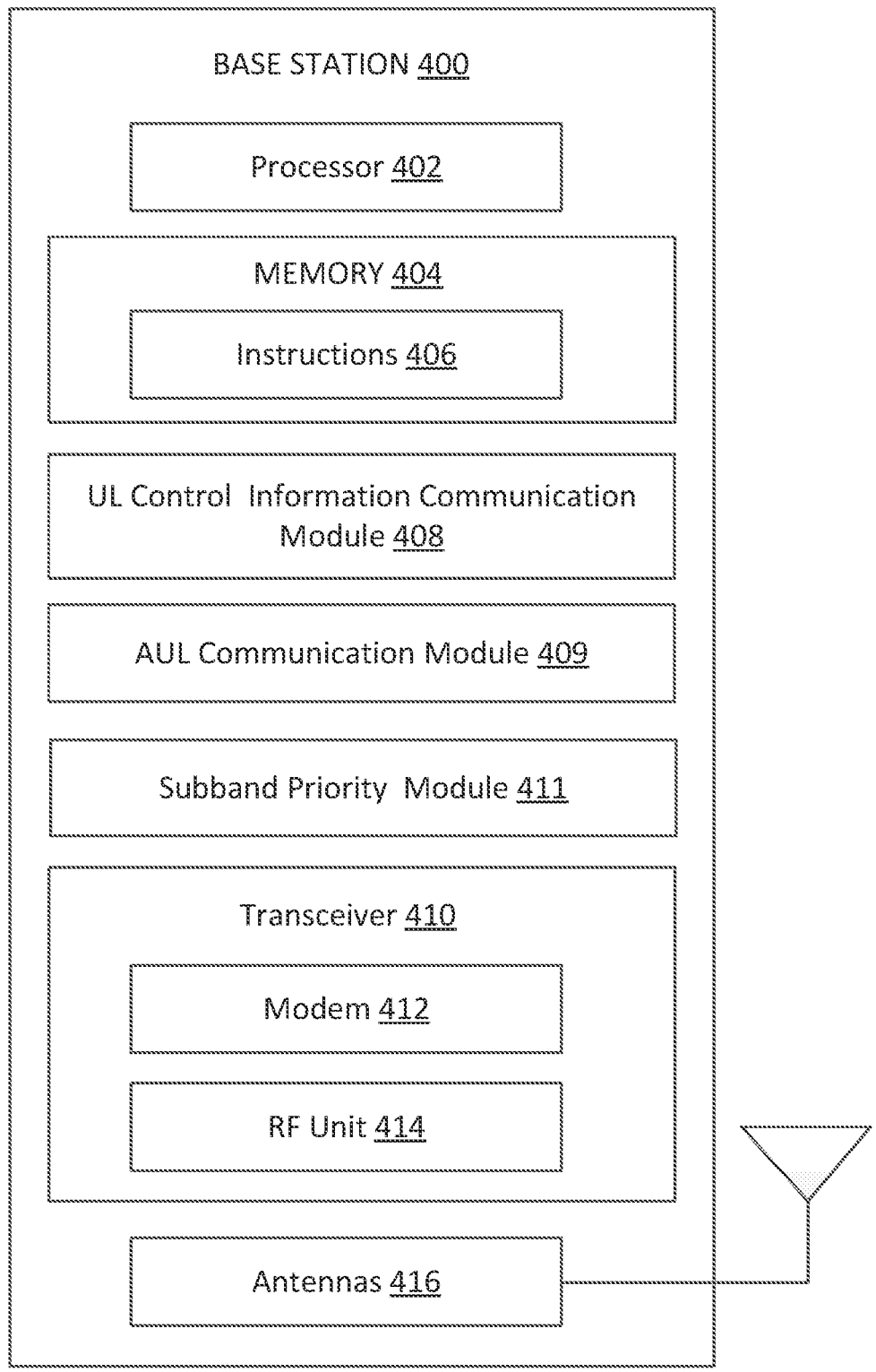
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 in the network 100 as discussed above in FIG. 1. A shown, the BS 400 may include a processor 402, a memory 404, a UL control information communication module 408, an AUL communication module 409, a subband priority module 411, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIG. 11. Instructions 406 may also be referred to as code, which may be interpreted broadly to include any type of computer-readable statement(s) as discussed above with respect to FIG. 3.

Each of the UL control information communication module 408, the AUL communication module 409, and the subband priority module 411 may be implemented via hardware, software, or combinations thereof. For example, each of the UL control information communication module 408, the AUL communication module 409, and the subband priority module 411 may be implemented as a processor, circuit, and/or instructions 406 stored in the memory 404 and executed by the processor 402. In some examples, the UL control information communication module 408, the AUL communication module 409, and/or the subband priority module 411 can be integrated within the modem subsystem 412. For example, the UL control information communication module 408, the AUL communication module 409, and/or the subband priority module 411 can be implemented by a combination of software components (e.g., executed by a DSP or a general processor) and hardware components (e.g., logic gates and circuitry) within the modem subsystem 412. In some examples, a BS may include one of the UL control information communication module 408, the AUL communication module 409, or the subband priority module 411. In other examples, a BS may include the UL control information communication module 408, the AUL communication module 409, and the subband priority module 411.

The UL control information communication module 408 and the AUL communication module 409 may be used for various aspects of the present disclosure, for example, aspects of FIG. 5-23. For example, the UL control information communication module 408 is configured to communicate a subband priority configuration to the UE which may not be UE specific, perform LBTs to acquire TXOPs in a channel, transmit multiple configurations to a UE (e.g., the UEs 115 and 300) for mapping a UL control resource indicator to a particular subband and/or a particular resource within a subband, transmit rules and/or conditions for selecting a configuration from the multiple configurations, schedule the UE for a UL control channel transmission, generate a UL control resource indicator based on the schedule, a selected mapping, rules, and/or conditions, transmit the UL control resource indicator to the UE, and receive a UL control channel signal from the UE based on the schedule and/or resource configuration. The rules and/or conditions may include whether a UL control channel signal is to be communicated within a TXOP of the BS 400 or outside a TXOP of the BS 400, whether a UL control channel ignal is to be communicated within a TXOP of the BS 400 in a subband acquired by the BS 400 or in a subband not acquired by the BS 400. The subband priority module 311 is configures to transmit semi-static preconfigured subband priority configuration information to UEs served by the BS 400 and communicate the semi-static preconfigured subband priority configuration information with the UL control information communication module 408. In some instances, the semi-static preconfigured subband priority may be cell specific. Mechanisms for communicating UL control information using redundant frequency resources are described in greater detail herein.

The AUL communication module 409 is configured to perform LBTs to acquire TXOPs in a channel, transmit a configuration to a UE indicating a plurality of AUL resource in a plurality of subbands, a priority order for the AUL resources, one or more sets of allowable starting offsets for starting an AUL transmission using the AUL resources, rules and/or conditions for selecting an AUL resource and/or a starting time offset, and/or receive AUL communications from the UE based on the configured AUL resources and/or rules and/or conditions. The rules and/or conditions may include whether an AUL signal is to be communicated within a TXOP of the BS 400 or outside a TXOP of the BS 400, whether an AUL signal is to be communicated within a TXOP of the BS 400 in a subband acquired by the BS 400 or in a subband not acquired by the BS 400. Mechanisms for communicating AUL data using redundant frequency resources are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115, 215, or 400. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement RATs.

FIGS. 5-8 illustrate various mechanisms for mapping UL control resource indicators to resources in subbands (e.g., the subbands 202) within a system bandwidth (e.g., the frequency band 201). In FIGS. 5-8, the schemes 500-800 may be employed by a BS such as the BSs 105 and 400 and a UE such as the UEs 115 and 300 in a network such as the network 100. In particular, a BS may employ the schemes 500, 600, 700, and/or 800 to communicate a UL control resource indicator with a UE when operating over a shared spectrum or an unlicensed spectrum. The schemes 500-800 are described using a similar subband configuration as in the scheme 200, and may use the same reference numerals for simplicity's sake. Additionally, the y-axes represent frequency in some constant units.

FIG. 5 illustrates a UL control resource indicator mapping scheme 500 according to some embodiments of the present disclosure. In the scheme 500, a BS grants a UE with a UL control resource 530 in the same subband 202 as where a corresponding UL transmission grant is transmitted. As shown, the BS transmits a UL control resource indicator 520 in the subband $202_{SB(2)}$. The UL control resource indicator 520 indicates a UL control resource 530 in the same the subband $202_{SB(2)}$ where the UL control resource indicator 520 is transmitted. The UL control resource 530 may include one or more REs 204 and may be similar to the UL control resource 230.

In an example, the UL control resource indicator 520 include a set of F bits. The set of F bits is mapped to resources in a subband 202. The set of F bits can identify up to $2^F$ number of UL control resources 530 in a subband 202.

FIG. 6 illustrates a UL control resource indicator mapping scheme 600 according to some embodiments of the present disclosure. In the scheme 600, a BS grants a UE with a UL control resource 630 in a particular subband 202. Similar to the scheme 500, the BS transmits a UL control resource indicator 620 in a subband $202_{SB(2)}$. However, the UL control resource indicator 620 can indicate a UL control resource 630 in any subband 202 within the system bandwidth. As shown, the UL control resource indicator 620 indicates a UL control resource 630 in the subband $202_{SB(1)}$. The UL control resource 630 may include one or more REs 204 and may be similar to the UL control resources 230 and 530.

In an example, the UL control resource indicator 620 includes a set of F bits for indicating a resource within a particular subband 202 similar to the scheme 500. The UL control resource indicator 620 additionally includes $\log_2(N)$ bits for indicating a subband 202 out of a total of N number of subbands 202. For example, N is 4 in the example shown in FIG. 6.

FIG. 7 illustrates a UL control resource indicator mapping scheme 700 according to some embodiments of the present disclosure. In the scheme 700, a BS grants a UE with multiple UL control resources 730 in each subband 202 within a system bandwidth (e.g., the frequency band 201). Similar to the schemes 500 and 600, the BS transmits a UL control resource indicator 720 in a subband $202_{SB(2)}$. However, the UL control resource indicator 720 indicates a UL control resource 730 in each subband 202. As shown, the UL control resource 730 is repeated in each subband 202. Each UL control resource 730 may include one or more REs 204 and may be similar to the UL control resources 230, 530, and 630.

In an example, the UL control resource indicator 720 includes a set of F bits for indicating a resource within a subband 202 similar to the scheme 500. However, the same frequency resource is repeated in each subband 202.

FIG. 8 illustrates a UL control resource configuration mapping scheme 800 according to some embodiments of the present disclosure. In the scheme 800, a BS grants a UE with multiple UL control resources 830 in a subset of subbands 202 within a system bandwidth (e.g., the frequency band 201). Similar to the schemes 500 and 600, the BS transmits a UL control resource indicator 820 in a subband $202_{SB(2)}$. However, the UL control resource indicator 820 indicates multiple UL control resource 830 in multiple subbands 202 within the system bandwidth. As shown, the UL control resource indicator 820 indicates a UL control resource 830 in the subband $202_{SB(1)}$ and a UL control resource 830 in the subband $202_{SB(3)}$. Each UL control resource 830 may include one or more REs 204 and may be similar to the UL control resources 230, 530, 630, and 730.

In an example, the UL control resource 830 in the subband $202_{SB(1)}$ has an offset of 4 REs (e.g., the REs 204) from the lowest frequency of the subband $202_{SB(1)}$. The UL control resource 830 in the subband $202_{SB(3)}$ also has an offset of 4 REs from the lowest frequency of the subband $202_{SB(3)}$. In another example, the mapping of the F bits may be different for the subbands $202_{SB(1)}$ and $202_{SB(3)}$ can be different.

In an example, the UL control resource indicator 820 includes a set of F bits for indicating a resource within a subband 202 similar to the schemes 500 and 700. The UL control resource indicator 820 additionally includes $\log_2$ (NchooseM) bits for indicating M subbands 202 out of a total of N number of subbands 202. M is 2, and hence NchooseM is 6 in example shown in FIG. 8

In another example, the BS may semi-statically preconfigure the M subbands 202. TheBS may transmit an RRC message indicating the M subbands 202 (e.g., the subbands $202_{SB(1)}$ and $202_{SB(3)}$). Thus, the BS may transmit a UL control resource indicator including a set of F bits to indicate a particular resource (e.g., the UL control resource 830). The UE may map the F bits to the M subbands and identify the particular resource within the a subband 202 of the M subbands 202 based on the F bits.

As can be observed from FIGS. 2 and 5-8, a BS (e.g., the BSs 105 and 400) may indicate UL control resources (e.g., the UL control resources 230, 530, 630, 730, and 830) using various mappings. In some embodiments, the BS may dynamically indicate one or more UL control resources by transmitting a UL control resource indicator (e.g., the UL control resource indicators 220, 520, 620, 720, and 820) via DCI in a DL control channel (e.g., a PDCCH). In some embodiments, the BS may semi-statically configure the subbands where a UL control resource may be located and/or the UL control resource within a corresponding preconfigured subband. In an embodiment, the BS may configure a UE (e.g., a UE 115 or 300) with multiple configurations for mapping a UL control resource indicator to a particular subband and/or to a particular resource within a subband. The BS may configure the UE with rules and/or conditions on how to select a mapping configuration as described in greater detail herein.

In an embodiment, when a UE is configured with multiple UL control resources in different subbands as shown in the schemes 700 and 800, the UE may select one UL control resource based on LBT statuses in corresponding subbands 202 and/or subband priority order may transmit a UL control information signal in the selected UL control resource as described in greater detail herein.

Figure 9:
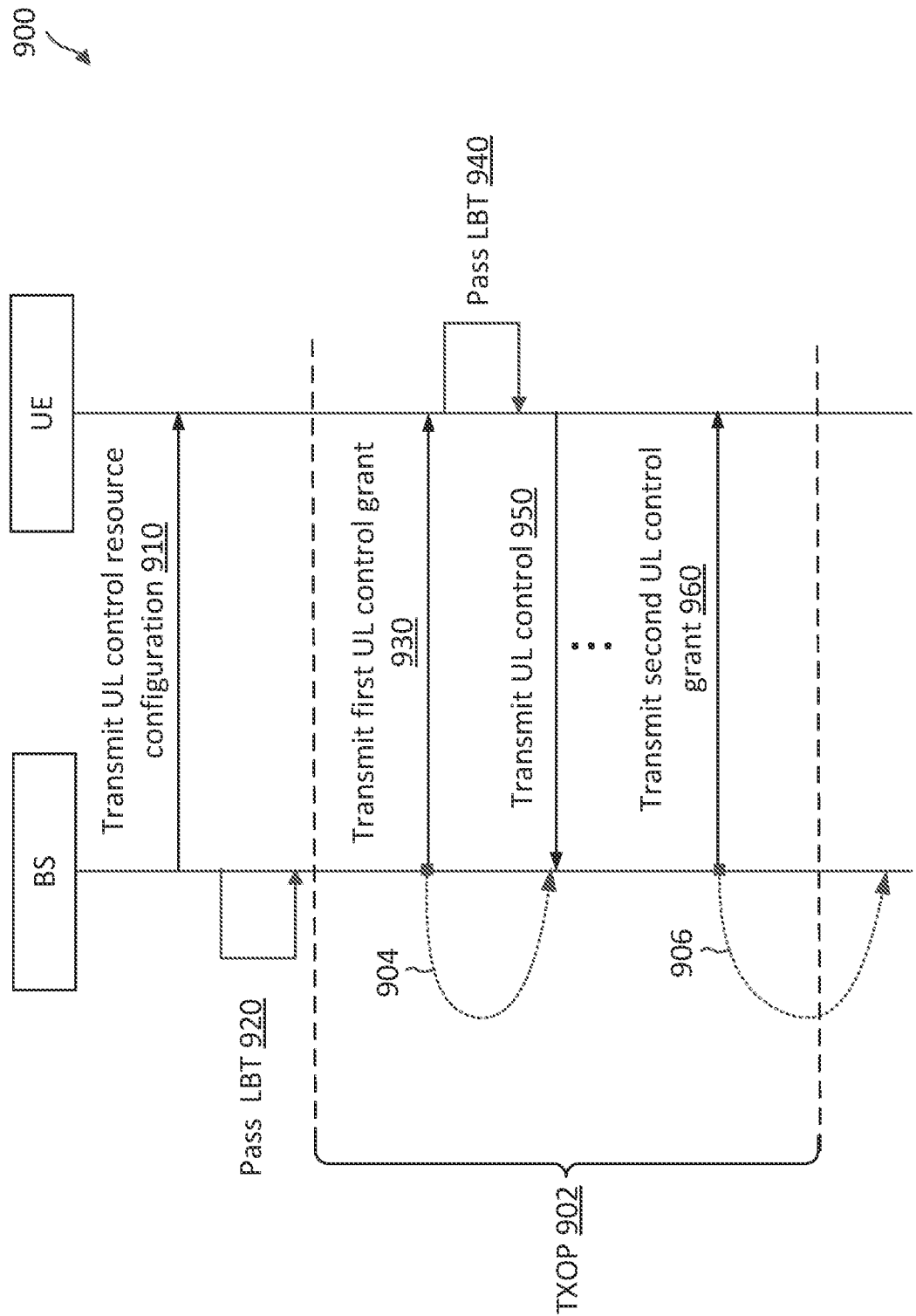
FIG. 9 is a signaling diagram illustrating a UL control channel communication method according to some embodiments of the present disclosure.

FIG. 9 is a signaling diagram illustrating a UL control channel communication method 900 according to some embodiments of the present disclosure. The method 900 is implemented between a BS (e.g., the BSs 105 and 400) and a UE (e.g., the UEs 115 and 300) in a network (e.g., the network 100). Steps of the method 900 can be executed by computing devices (e.g., a processor, processing circuit, and/or other suitable component) of the BS and the UE. As illustrated, the method 900 includes a number of enumerated steps, but embodiments of the method 900 may include additional steps before, after, and in between the enumerated steps. In some embodiments, one or more of the enumerated steps may be omitted or performed in a different order. The method 900 may employ any suitable combinations of the schemes 200, 500, 600, 700, and 800 described above with respect to FIGS. 2, 5, 6, 7, and 8.

At step 910, the BS transmits a UL control resource configuration. The UL control resource configuration may indicate a plurality of options for mapping a UL control resource indicator (e.g., the UL control resource indicators 220, 520, 602, 720, and 820) to resources in a plurality of subbands (e.g., the subbands 202) within a network system bandwidth (e.g., the frequency band 201). The mapping options may be similar to the mappings described above in the schemes 200 and 500-800. As an example, the configuration may include options 0, 1, 2, 3, and 4 corresponding to the mapping schemes 200, 500, 600, 700, and 800, respectively, and an option 5 corresponding to the scheme 800, but with a semi-static subband configuration. The configuration can indicate when to apply a particular option. For example, the configuration may indicate one mapping option for a UL control information transmission within a TXOP 902 acquired by the BS and another mapping option for a UL control information transmission outside a TXOP 902 of the BS. In an example, the BS may also configure the UE to use a particular mapping option. In some examples, the UL control resource configuration may additionally include a subband priority configuration. The subband priority may be cell-specific, and thus may be dependent on the cell index. In some examples, the BS may transmit the subband priority configuration in a separate configuration message.

As an example, the BS may configure options 0 and 5 as valid options and configure rules for determining a UL control resource indicator mapping. The BS may indicate that option 0 may be used when a UL control information transmission is within a TXOP 902 acquired or won by the BS. The BS may indicate that option 5 may be used when a UL control information transmission is outside a TXOP 902 of the BS. The BS may select the option 0 (e.g., with one resource) for use within a TXOP of the BS since the BS already acquired the TXOP, and thus the UE may likely to pass an LBT. The BS may select the option 5 (e.g., with redundant resources in different subbands) for use outside a TXOP of the BS since the UE may or may not pass an LBT in a particular subband. It should be noted that in some instances, some of the configuration information can be predetermined, for example, specified in a wireless communication standard.

At step 920, the BS performs an LBT in the channel and passes an LBT. In other words, the BS acquired a TXOP 902 in the channel.

At step 930, the BS transmits a first UL control grant to the UE. The first UL control grant may be a DCI message and may include a UL control resource indicator similar to the UL control resource indicators 220, 520, 620, 720, and 820. Referring to the example where option 0 is used for a UL control information transmission is within a TXOP of the BS, the BS may apply the scheme 200 to indicate the UL resource indicator for option 0. The UL control resource indicator may include $\log_2(K)$ bits identifying a resource (e.g., the UL control resource 230a) out of the K preconfigured resources (e.g., the UL control resources 230) during a time within the TXOP 902 as shown by the arrow 904.

At step 940, the UE performs an LBT in channel and passes the LBT. For example, the UE may identify the assigned or granted UL control resource based on the mapping option 0. The UE may perform the LBT in the subband (e.g., the subband $202_{SB(2)}$) where the identified resource is located. Since the BS has already acquired the TXOP 902 and the UE is likely to pass the LBT, the UE may perform the LBT in the CAT2 mode.

At step 950, the UE transmits a UL control signal (e.g., including an HARQ ACK/NACK) to the BS using the identified resource. In an embodiment, the UE may transmit the UL control signal when the LBT in the subband where the identified resource passes and a slot format indicator (SFI) (e.g., received from the BS in a PDCCH) indicates that the a UL format for the duration of the identified resource.

At step 960, the BS transmits a second UL control grant to the UE. The UL control grant may indicate a UL control resource outside a duration of the TXOP 902 as shown by the arrow 906. Referring to the example where option 5 is used for a UL control information transmission is outside a TXOP of the BS, the BS may apply indicate the UL resource indicator for option 5. The BS may have configured the UE with the semi-static subbands where UL control resources may be located. Thus, the second UL control grant may include a UL control resource indicator including F bits for identifying a resource within each corresponding preconfigured subband. The UE may perform a CAT4 LBT each subband and select a resource based on a subband priority order.

Figure 10:
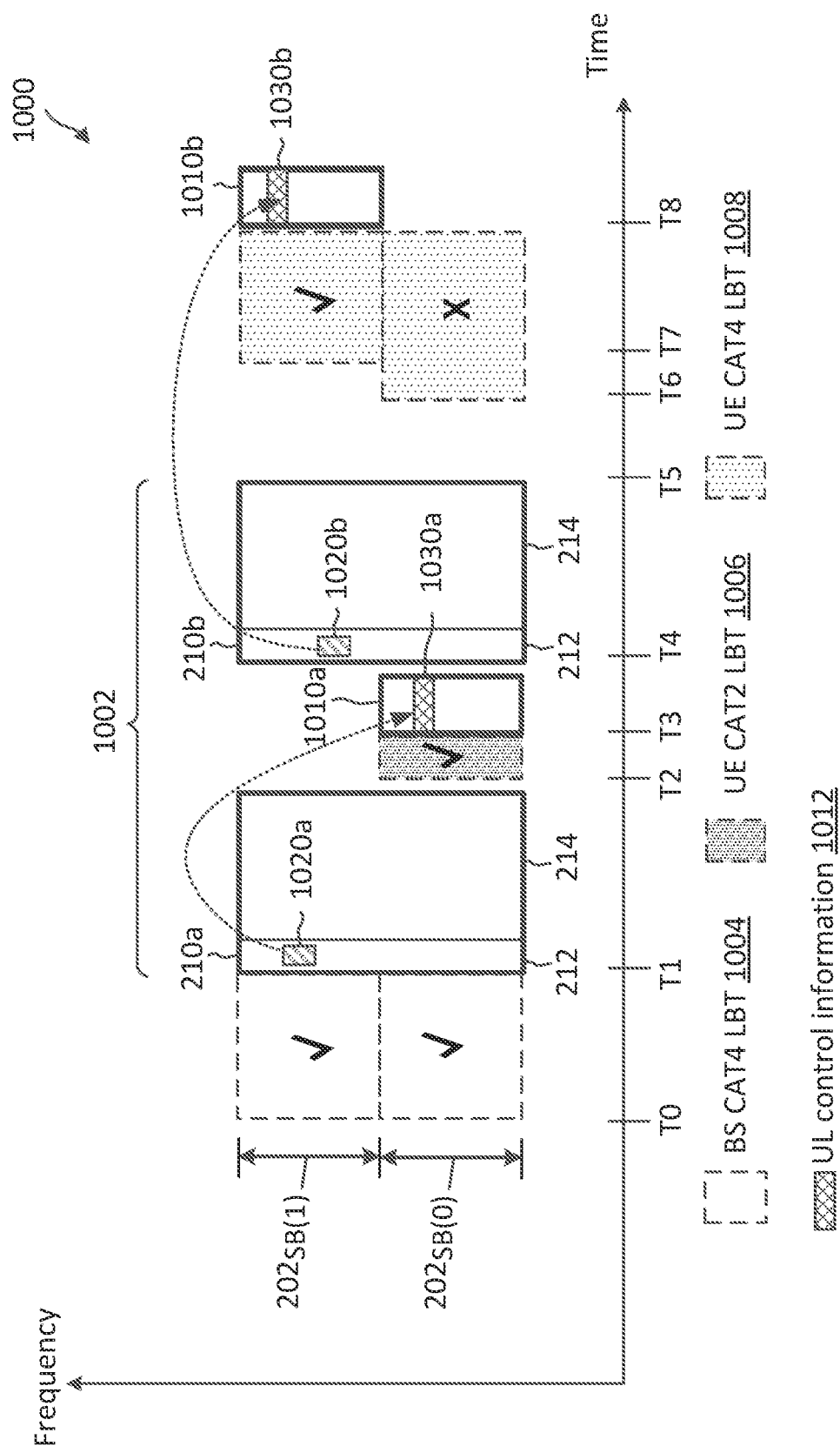
FIG. 10 illustrates a UL control channel communication scheme according to some embodiments of the present disclosure.
Figure 11:
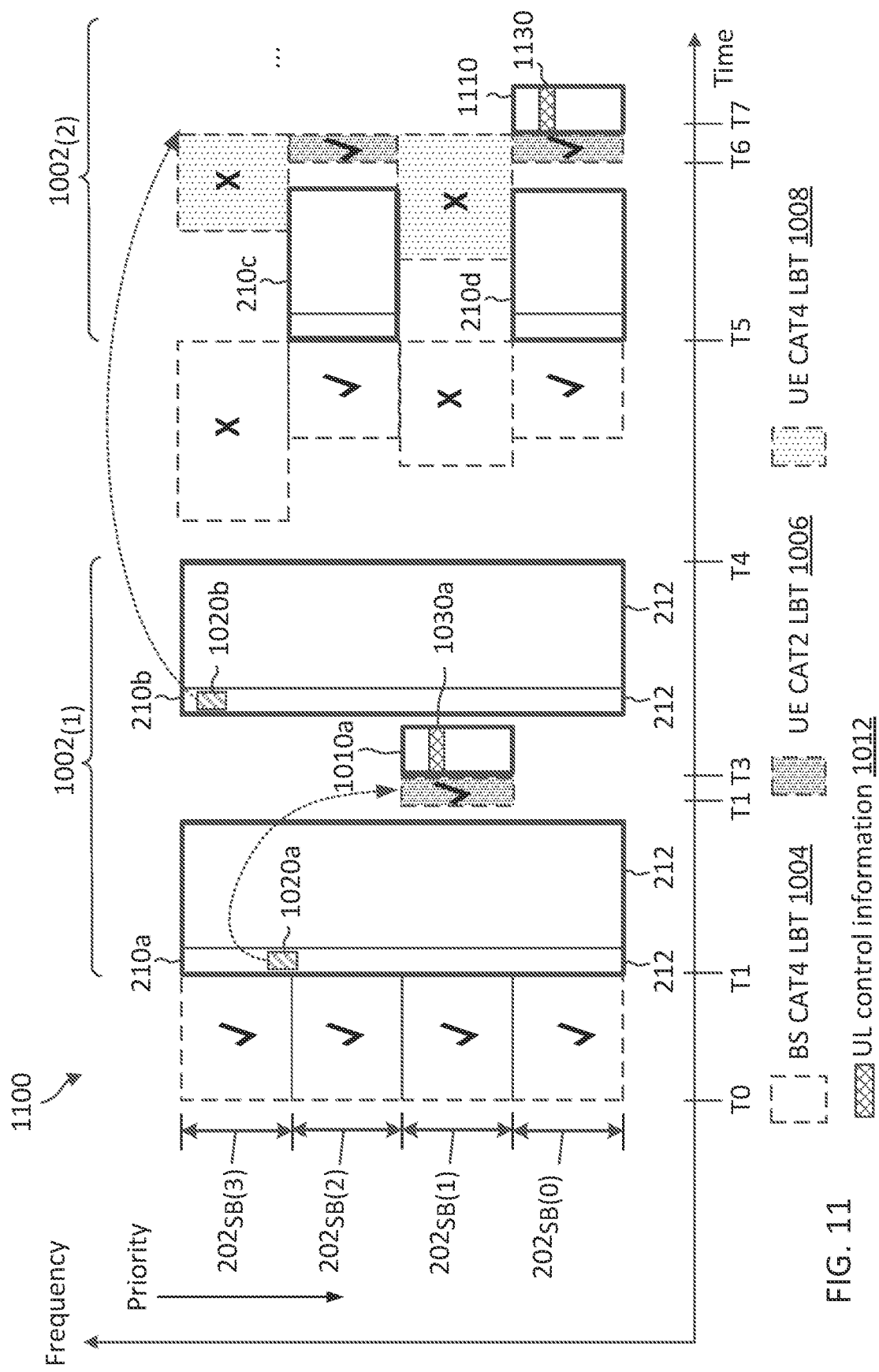
FIG. 11 illustrates a UL control channel communication scheme according to some embodiments of the present disclosure.

FIGS. 10-11 illustrate various mechanisms for UL control information (e.g., HARQ ACK/NACK, SR, and CQI) communications within a TXOP (e.g., the TXOP 902) of a BS and outside a TXOP of a BS. In FIGS. 10-11, the schemes 1000 and 1100 may be employed by a BS such as the BSs 105 and 400 and a UE such as the UEs 115 and 300 in a network such as the network 100. In particular, a BS may employ the schemes 1000 and/or 1100 to communicate UL control information with a UE when operating over a shared spectrum or an unlicensed spectrum. The schemes 1000 and 1100 are described using a similar subband configuration as in the scheme 200, and may use the same reference numerals for simplicity's sake. Additionally, the x-axes represent time in some constant units and the y-axes represent frequency in some constant units.

FIG. 10 illustrates a UL control channel communication scheme 1000 according to some embodiments of the present disclosure. For simplicity of illustration and discussion, FIG. 10 illustrates 2 subbands 202, but may be scaled to include any number of subbands 202 (e.g., about 3, 4, 5, or more). In the scheme 1000, a BS may grant a UE with a UL control information transmission within a TXOP of the BS using an option 0 (e.g., the scheme 200) and a UL control information transmission outside a TXOP of the BS using an option 5 (e.g., the scheme 800 with M preconfigured subbands). The BS may preconfigure the subbands $202_{SB(0)}$ and $202_{SB(1)}$ for option 5. Thus, N is 2 and M is 2 in the example shown in FIG. 10.

At time T0, the BS performs a CAT4 LBT 1004 in each of the subbands $202_{SB(0)}$ and $202_{SB(1)}$. For example, the CAT4 LBT 1004 passes in each of the subbands $202_{SB(0)}$ and $202_{SB(1)}$ as shown by the checkmarks. The BS may reserve a TXOP 1002 (e.g., the TXOP 902) with a duration between time T1 and time T5.

At time T1, the BS transmits a DL communication signal 210a. The DL communication signal 210a includes a grant including UL control resource indicator 1020a for a UE. The BS may generate the UL control resource indicator 1020a based on option 0 since the grant is for a transmission within the TXOP 1002. For example, the UL control resource indicator 1020a includes $\log_2(K)$ bits indicating a resource 1030a in the subband $202_{SB(0)}$ at time T3 within the TXOP 1002.

The UE may monitor for a subband acquisition indication from the BS in each subband 202. The subband acquisition indication may include a common DL control information message (e.g., common PDCCH for all UEs) or an SFI, for example, in a control portion 212 of the DL communication signal 210a. The BS may also include timing information (e.g., a channel occupancy time (COT)) associated with the TXOP 1002 in a common PDCCH or SFI. The UE may determines that the BS has acquired determine the subbands $202_{SB(0)}$ and $202_{SB(1)}$ in the TXOP 1002. Thus, upon receiving the UL control resource indicator 1020a, the UE may interpret or map the UL control resource indicator 1020a based on option 0.

At time T2, the UE performs a CAT2 LBT 1006. For example, the LBT 1006 is a pass as shown by the checkmark. Thus, at time T4, where the UL control resource 1030a is located, the UE transmits UL control information 1012 (e.g., HARQ ACK/NACK, SR, and/or CQI) using the UL control resource 1030a identified by the UL control resource indicator 1020a. The UE may include the UL control information 1012 in a UL communication signal 1010a.

At time T4, the BS transmits another DL communication signal 210b including a UL control resource indicator 1020b for the UE. The UL control resource indicator 1020b indicates a UL control resource 1030b outside of the BS's TXOP 1002. The BS may generate the UL control resource indicator 1020b based on option 5 since the grant is for a transmission outside the TXOP 1002. For example, the UL control resource indicator 1020b includes F bits indicating a resource 1030b within the subband $202_{SB(1)}$ and a resource (not shown) within the subband within the subband $202_{SB(0)}$ at time T8 (outside of the TXOP 1002).

Upon receiving the UL control resource indicator 1020b, the UE detects that the UL control resource indicator 1020b indicates a resource outside of the TXOP 1002. Thus, the UE may interpret or map the UL control resource indicator 1020b based on option 5 and performs LBT in the preconfigured subbands $202_{SB(0)}$ and $202_{SB(1)}$ accordingly. As shown, at time T6, the UE performs a CAT4 LBT 1008 in the subband $202_{SB(0)}$. At time T7, the UE performs a CAT4 LBT 1008 in the subband $202_{SB(0)}$. For example, the CAT4 LBT 1008 in the subband $202_{SB(1)}$ is a pass as shown by the checkmark and the CAT4 LBT 1008 in the subband $202_{SB(0)}$ fails as shown by the cross mark. Thus, at time T8, where the UL control resource 1030b is located, the UE transmits UL control information 1012 using the UL control resource 1030b identified by the UL control resource indicator 1020b. The UE may include the UL control information 1012 in a UL communication signal 1010b.

In some embodiments, the BS may indicate a LBT category type in a UL grant to a UE. For example, the UL control resource indicator 1020*a* can include a CAT2 LBT indication and the UL control resource indicator 1020*b* can include a CAT4 LBT indication.

In some embodiments, the BS may further indicate whether a particular grant is within a TXOP of the BS. For example, the UL control resource indicator 1020*a* can include an indication indicating that the grant is for a transmission inside a TXOP of the BS and the UL control resource indicator 1020*b* can include an indication indicating that the grant is for a transmission outside of a TXPO of the BS.

While FIG. 10 illustrates that the UE passes LBT 1008 in one subband $202_{SB(1)}$, in some instances, the UE may pass LBT 1008 in multiple subbands 202. For example, when the BS uses options 3, 4, and/or 5, the UE may be allocated with redundant frequency resources in different subbands 202. The UE may perform an LBT in each subband 202 that includes an allocated UL control resource. The UE may pass LBT in one or more of the subbands 202. The UE may select a UL control resource subband based on a predetermined subband priority. The selection based on a subband priority can allow other subbands to be left free.

In an embodiment, the priority can be implicit. For example, the lowest frequency subband 202 (e.g., the subband $202_{SB(0)}$) may have the highest priority. Alternatively, the highest frequency subband 202 (e.g., the subband $202_{SB(1)}$) may have the lowest priority. The priority can be semi-statically configured via an RRC configuration and/or via DCI. In an example, an RRC configuration may include multiple predetermined subband priority order configurations and the DCI may select one of the configurations.

In an embodiment, the subband priority order may be cell specific. In other words, all UEs within a cell may use the same subband priority order for UL control transmissions or PUCCH transmissions. To use cell-specific subband priority order, multiple UEs' PUCCH transmissions can be multiplexed via orthogonal cover code (OCC). Thus, when all UEs selects a given subband for UL control information transmissions, the other subbands 202 or BWPs may be left free for use by other entities sharing the same channel. Thus, the cell-specific subband priority order can improve spectrum utilization efficiency. When utilizing cell-specific subband priority, al UEs may use one subband 202 for UL control information (e.g., HARQ ACK/NACK) transmissions.

Returning to the example shown in FIG. 10, when the UE passes CAT4 LBTs 1008 in the both subbands $202_{SB(0)}$ and $202_{SB(1)}$, the UE may select the resource from the higher priority subband 202. As an example, the subbands $202_{SB(0)}$ may have a higher priority than the subband $202_{SB(1)}$. Thus, the UE may determine to use the resource in the subband $202_{SB(0)}$ instead of the resource 1030*a* in the subband $202_{SB(1)}$ as shown.

FIG. 11 illustrates a UL control channel communication scheme 1100 according to some embodiments of the present disclosure. The scheme 1100 is substantially similar to the scheme 1000, but the BS reacquires a TXOP after granting a UL control transmission outside of a current TXOP. In the example shown in FIG. 11, the BS may preconfigure the subbands $202_{SB(0)}$ and $202_{SB(2)}$ out of the four subbands 202 for option 5 mapping. Thus, N is 4 and M is 2 in the example shown in FIG. 10.

At time T0, the BS performs a CAT4 LBT 1004 in each of the subbands 202. For example, all LBTs 1004 pass, and thus the BS acquire a TXOP $1002_{(1)}$. The TXOP $1002_{(1)}$ includes a duration between time T1 and time T4. The BS configures the UE with a UL control resource indicator 1020*a* (e.g., using the option 0 mapping) for a UL control resource 1030*a* at time T3 within the TXOP $1002_{(1)}$. At time T2, the UE performs a CAT2 LBT 1006. The CAT2 LBT 1006 passes, and thus the UE transmits UL control information 1012 using the UL control resource 1030*a*. The BS further configures the UE with a UL control resource indicator 1020*b* (e.g., using the option 5 mapping) for a UL control resource 1130 at time T7 outside the TXOP $1002_{(1)}$.

Subsequently, at time T5, the BS reacquires a TXOP $1002_{(2)}$, but only in the subbands $202_{(0)}$ and $202_{(2)}$. As shown, the BS passes a CAT4 LBT 1004 in each of the subband $202_{(0)}$ and $202_{(2)}$ as shown by the checkmarks and fails a CAT4 LBT 1004 in each of the subband $202_{(1)}$ and $202_{(3)}$ as shown by the cross marks. The previously granted UL control resources 1130 is now within the BS acquired TXOP $1002_{(2)}$.

The UE may detect the reacquisition of the subbands $202_{(0)}$ and $202_{(2)}$ in the TXOP $1002_{(2)}$ based on common PDCCH monitoring or SFI monitoring. In an embodiment, the BS may have indicated a CAT4 LBT in the grant for the UL control resource indicator 1020*b*. Thus, the UE may switch to perform CAT2 LBT based on a detection of a subband acquisition indication from the BS in the subbands $202_{(0)}$ and $202_{(2)}$. As shown, the UE performs a CAT2 LBT 1006 in each of the BS's acquired subbands $202_{(0)}$ and $202_{(2)}$ and performs a CAT4 LBT 1008 in each of the subbands $202_{(1)}$ and $202_{(3)}$ not acquired by the BS. The LBTs 1006 in the subbands $202_{(0)}$ and $202_{(2)}$ pass as shown by the checkmarks. LBTs 1008 in the subbands $202_{(1)}$ and $202_{(3)}$ fail as shown by the cross marks.

At time T7, the UE selects a resource 1130 for transmitting UL control information based on a subband priority order. For example, the subbands $202_{(0)}$, $202_{(1)}$, $202_{(2)}$, and $202_{(3)}$ have a decreasing priority. In an example referring to as option A, the UE may select the highest priority subband 202 with a CAT2 LBT pass among the BS's acquired subbands 202 instead of based the preconfigured M subbands and may transmit UL control information 1012 in that subband 202. As shown, the UE selects the resource 1130 in the subband $202_{(0)}$ (having a higher priority than the subband $202_{(2)}$) for the UL control information transmission. The subband priority order may be determined by a preconfigured subband priority configuration through an RRC message from BS to UE. In some examples this subband priority configuration may be cell id specific and not necessarily UE specific.

In another example referring to as option B, the UE may perform a CAT2 LBT 1006 in each of the BS's acquired subbands 202 (e.g., the subabnds $202_{(0)}$ and $202_{(2)}$) and perform a CAT4 LBT 1008 in each of the subbands 202 (e.g., the subabnds $202_{(1)}$ and $202_{(3)}$) not acquired by the BS instead of based on the M preconfigured subbands 202. When the CAT2 LBTs 1006 fail in the BS's acquired subbands and the CAT4 LBT 1008 pass, the UE may select a resource from a subband 202 not acquired by the BS based on the subband priority order.

In yet another example referring to as option C, the UE may use option 5 and perform CAT2 LBT 1006 in each of the preconfigured M subband 202 and CAT4 LBT 1008 in other subbands 202 and transmit UL control information 1012 in the highest priority among all subbands 202 that passed LBT. The UL control resource indicator 1020*b* include F bits. The UE may identify a resource from a selected subband (e.g., the highest priority suband 202 with a LBT pass) based on the F bits.

In some embodiments, a BS may grant a UE with a UL control transmission within a TXOP (e.g., the TXOPs 902 and 1012) of the BS. However, the BS may allow the UE to transmit the UL control information in a subband 202 not acquired by the BS. In such embodiments, the BS may configure the UE to select a resource from a highest priority BS's acquired subband with a CAT2 LBT pass (option A), select a resource from a highest priority subband with a CAT2 LBT pass or a CAT4 LBT pass (option B), or select a resource based on option 5 (option C).

In some embodiments, a BS (e.g., the BSs 105 and 400) and a UE (e.g., the UEs 115 and 300) may communicate UL control information (e.g., SRs, CQIs, HARQ ACK/NACK) with each other using any suitable combinations of the schemes 200, 500, 600, 700, 800, 1000, and 1100 described with respect to FIGS. 2, 5, 6, 7, 8, 10, and 11 and the method 900 described with respect to FIG. 9. In some examples, a UE may select a subband for transmitting UL control information (e.g., the UL control information 1012) by monitoring whether the UL control information is to be transmitted inside a TXOP (e.g., TXOPs 1002) of the BS or outside of a TXOP of the BS followed by performing an LBT (e.g., the LBTs 1006 or 1008) in each subband (e.g., the subband 202) or in chosen subbands. Subsequently, the UE selects a subband based on the subband acquisition status in each subband, a subband priority configuration provided by the BS, and the LBT status.

Figure 12:
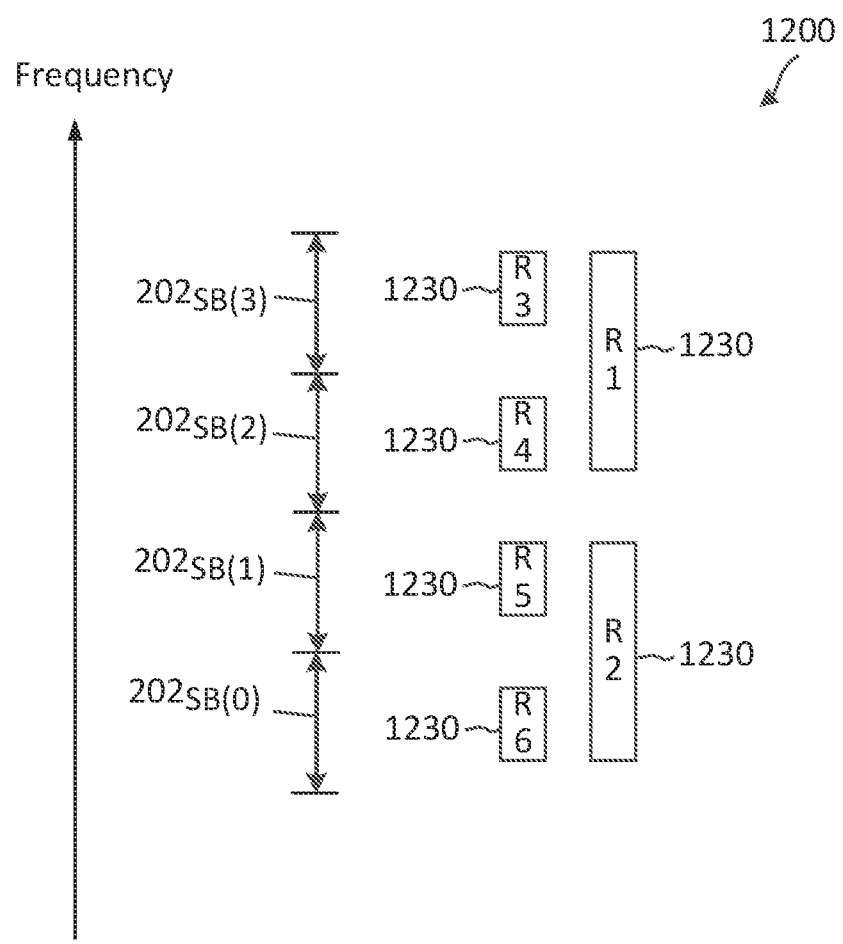
FIG. 12 illustrates an autonomous uplink (AUL) resource configuration scheme according to some embodiments of the present disclosure.

FIG. 12 illustrates an AUL resource configuration scheme 1200 according to some embodiments of the present disclosure. The scheme 1200 may be employed by a BS such as the BSs 105 and 400 and a UE such as the UEs 115 and 300 in a network such as the network 100. In particular, a BS may employ the scheme 1200 to configure multiple frequency resources for AUL communications when operating over a shared spectrum or an unlicensed spectrum. The scheme 1200 is described using a similar subband configuration as in the scheme 200, and may use the same reference numerals for simplicity's sake. In FIG. 12, the y-axis represents frequency in some constant units.

In the scheme 1200, a BS configures multiple frequency-division multiplex (FDM) AUL resources 1230 for a UE to select for AUL transmissions. The BS may configure the AUL resources 1230 in different subbands 202. The AUL resource may span one or more subbands 202. For simplicity of discussion and illustration, FIG. 12 illustrates that the BS configure six AUL resources 1230 (e.g., label with R1, R2, R3, R4, R5, and R6) in the subbands 202 of the system bandwidth (e.g., the frequency band 201), but may be scaled to configure any suitable number of AUL resources 1230 (e.g., about 2, 3, 4, 5, 7, or 8 or more). As shown, the AUL resource R1 1230 is located in the subbands 202$_{(2)}$ and 202$_{(3)}$. The AUL resource R2 1230 is located in the subbands 202$_{(0)}$ and 202$_{(1)}$. The AUL resource R3 1230 is located in the subband 202$_{(3)}$. The AUL resource R4 1230 is located in the subband 202$_{(2)}$. The AUL resource R5 1230 is located in the subband 202$_{(2)}$. The AUL resource R6 1230 is located in the subband 202$_{(0)}$. The BS may configure a priority order for the AUL resources 1230. As an example, the AUL resources R1, R2, R3, R4, R5, and R6 1230 may have a decreasing priority order. The BS may configure a UE with the AUL resources 1230 and a priority order of the AUL resources 1230.

In an embodiment, the BS may configure the priority order of the AUL resources via RRC configuration. The priority order can be time varying. The priority order may be randomized to avoid collision across UEs. For example, one UE may be configured with one priority order for using the AUL resources 1230 and another UE may be configured with a different priority order for using the AUL resources 1230. In other words, different UEs may be configured with different priority orders for using the AUL resources 1230. In some instances, a priority order may include the same priorities for some of the AUL resources 1230. For example, the AUL resources R3 and R1 may have the same priority. As such, the UE can select any one of the AUL resource R3 1230 or the AUL resource R1 1230 based on LBT results in the subbands 202$_{SB(2)}$ and 202$_{SB(3)}$.

Figures 13, 14:
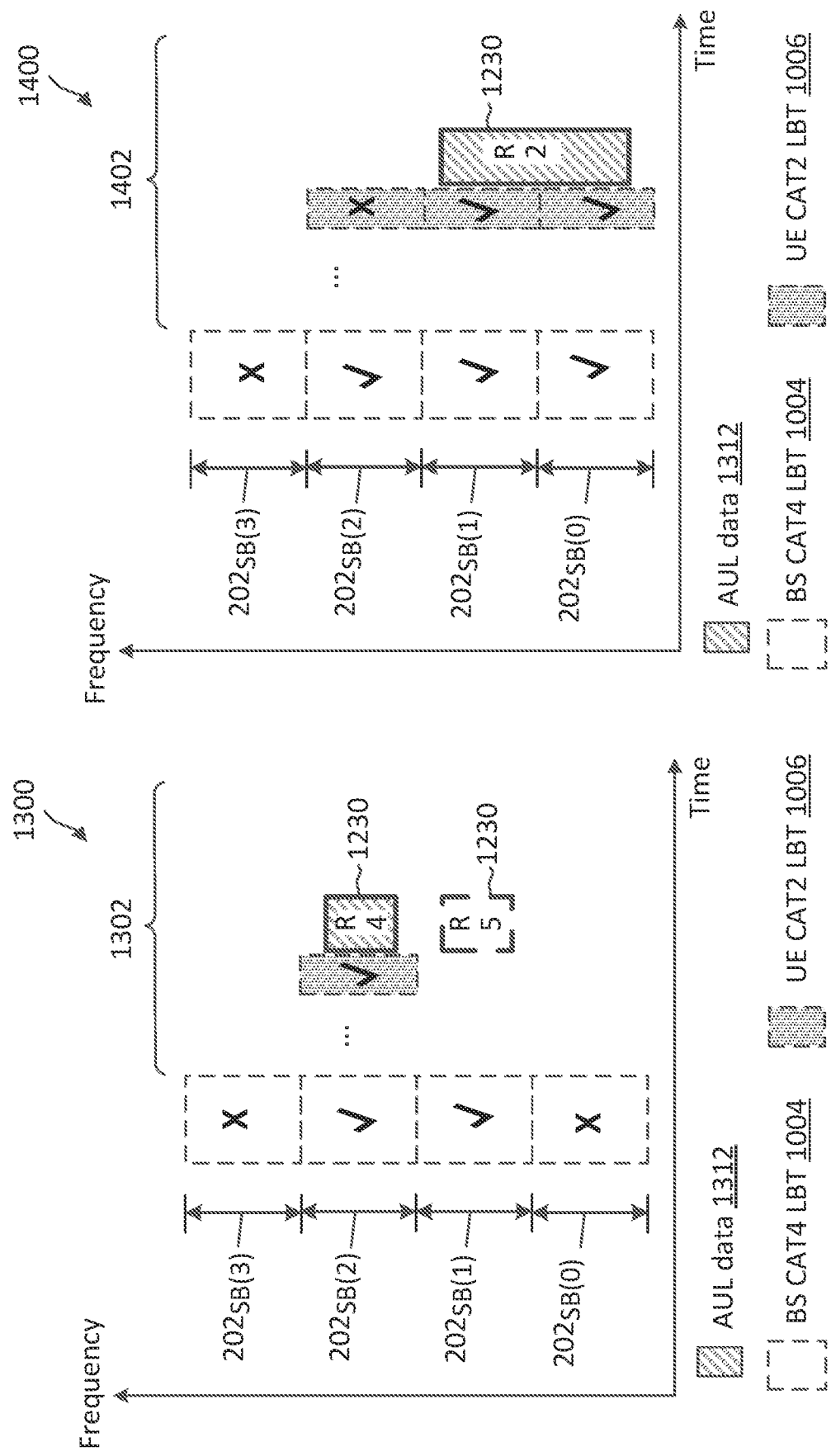
FIG. 13 illustrates an AUL resource selection scheme according to some embodiments of the present disclosure.
FIG. 14 illustrates an AUL resource selection scheme according to some embodiments of the present disclosure.
Figure 15:
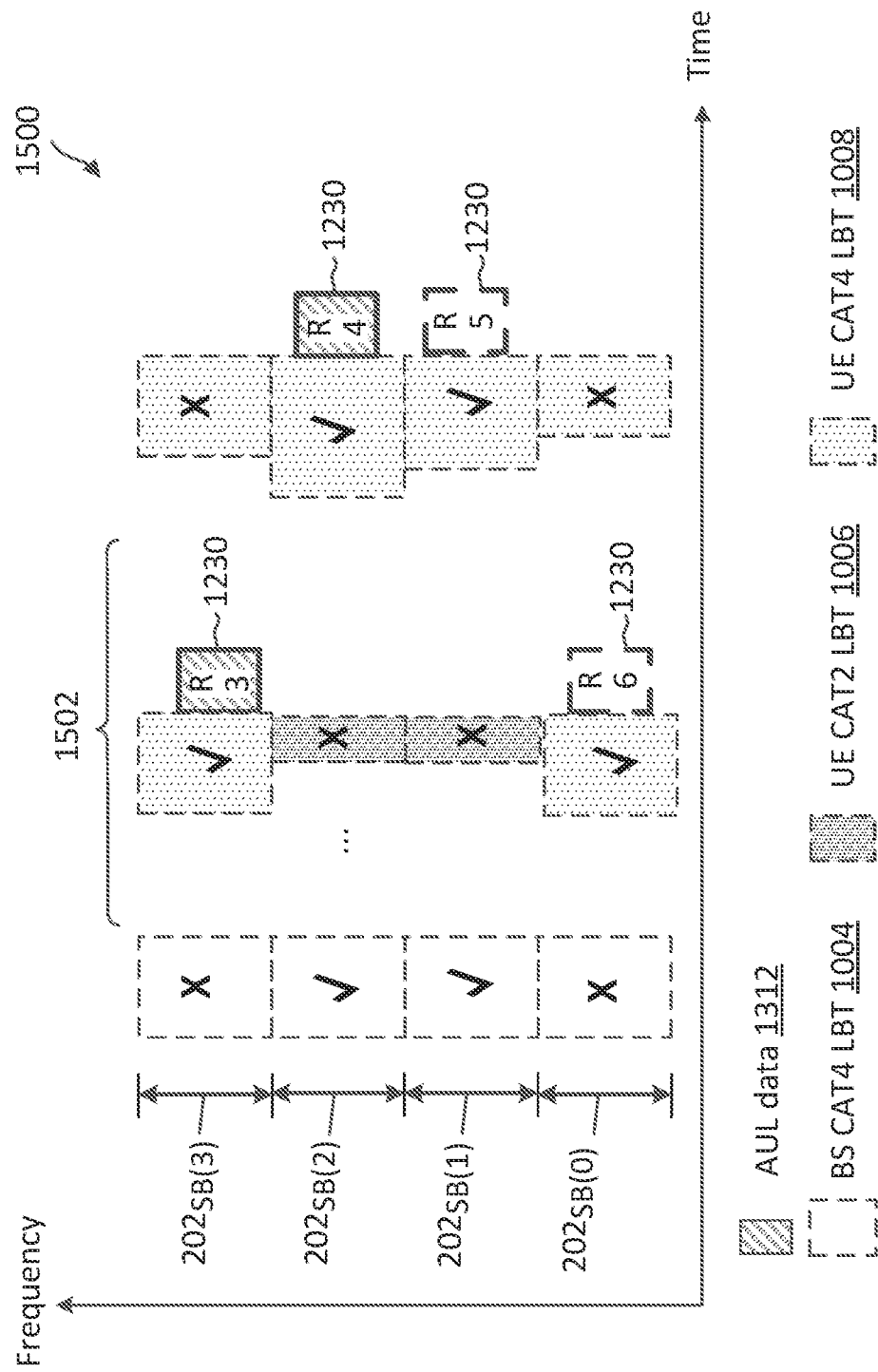
FIG. 15 illustrates an AUL resource selection scheme according to some embodiments of the present disclosure.

FIGS. 13-15 illustrate various mechanisms for AUL communications with redundant frequency resources. In FIGS. 13-15, the schemes 1300-1500 may be employed by a BS such as the BSs 105 and 400 and a UE such as the UEs 115 and 300 in a network such as the network 100. In particular, a BS may employ the schemes 1300, 1400, and/or 1500 to communicate AUL communications with a UE when operating over a shared spectrum or an unlicensed spectrum. The schemes 1300-1500 are described using a similar AUL resource configuration and AUL resource priority order as in the scheme 1200. Additionally, the axes represent time in some constant units, and the y-axes represent frequency in some constant units.

FIG. 13 illustrates an AUL resource selection scheme 1300 according to some embodiments of the present disclosure. The scheme 1300 is described using a similar subband configuration as in the scheme 200, and may use the same reference numerals for simplicity's sake. In the scheme 1300, when a UE transmits AUL data inside a BS's TXOP, the UE is allowed to select AUL resource 1230 within a highest priority subband 202 acquired by the BS. As shown, the BS performs a CAT4 LBT 1004 in each subband 202. The CAT4 LBTs 1004 in the subbands 202$_{SB(1)}$ and 202$_{SB(2)}$ passed as shown by the checkmarks, but the CAT4 LBTs 1004 in the subbands 202$_{SB(0)}$ and 202$_{SB(3)}$ failed as shown by the cross marks. Thus, the BS may gain a TXOP 1302 (e.g., the TXOPs 902 and 1002) with acquired subbands 202$_{SB(1)}$ and 202$_{SB(2)}$.

The UE may determine whether AUL transmission is allowed in the TXOP 1302. The UE may monitor for common PDCCH and/or SFI. The UE may receive a common PDCCH indicating that AUL is allowed and/or an SFI does not indicate a DL format for the AUL resources 1230. The UE may identify the highest priority AUL resources 1230 within the BS's acquired subbands 202$_{SB(2)}$ and 202$_{SB(3)}$ and perform a CAT2 LBT 1006 in the subband 202 corresponding to the highest priority AUL resource 1230. As shown, the AUL resource R4 1230 and the AUL resource R5 1230 are available in the BS's acquired subbands 202$_{SB(2)}$ and 202$_{SB(3)}$. The UE selects the highest priority available AUL resource R4 1230 for an AUL transmission. The performs a CAT2 LBT 1006 in the subband 202$_{SB(2)}$ where the AUL resource R4 1230 is located. The CAT2 LBT 1006 is a pass as shown by the checkmark. Thus, the UE transmits AUL data 1312 using the AUL resource R3 1230.

In the scheme 1300, the UE may prepare a single UL data packet based on the selected AUL resource R3 1230. The BS may also be able to determine the subband 202 where the AUL transmission may happen if the UE does transmits AUL data and use the other subbands 202 for other granted or scheduled UL transmissions (e.g., granted PUSCH transmissions).

FIG. 14 illustrates an AUL resource selection scheme 1400 according to some embodiments of the present disclosure. The scheme 1400 is described using a similar subband configuration as in the scheme 200, and may use the same reference numerals for simplicity's sake. In the scheme 1400, when a UE transmits AUL data inside a BS's TXOP, the UE is allowed to select a highest priority AUL resource 1230 within the subbands 202 acquired by the BS. As shown, the BS performs a CAT4 LBT 1004 in each subband 202. The CAT4 LBTs 1004 in the subbands $202_{SB(0)}$, $202_{SB(1)}$, and $202_{SB(2)}$ passed as shown by the checkmarks, but the CAT4 LBTs 1004 in the subband $202_{SB(3)}$ failed as shown by the cross mark. Thus, the BS may gain a TXOP 1402 (e.g., the TXOPs 902, 1002, and 1302) with acquired subbands $202_{SB(0)}$, $202_{SB(1)}$, and $202_{SB(2)}$.

Similar to the scheme 1300, after the UE determines AUL transmission is allowed in the TXOP 1402, the UE performs a CAT2 LBT 1006 in each of the BS's acquired subbands $202_{SB(0)}$, $202_{SB(1)}$ and $202_{SB(2)}$. As shown, the CAT2 LBTs 1006 in the subbands $202_{SB(0)}$ and $202_{SB(1)}$ passed as shown by the checkmarks, and the CAT2 LBT 1006 in the subband $202_{SB(2)}$ failed as shown by the cross mark. Referring to the scheme 1200, the AUL resources R2, R5, and R6 are available in the subbands $202_{SB(0)}$ and $202_{SB(1)}$. The UE selects the highest priority AUL resource R2 1230 from the available AUL resources 1230 and transmits AUL data 1312 using the selected AUL resource R2 1230.

FIG. 15 illustrates an AUL resource selection scheme 1500 according to some embodiments of the present disclosure. The scheme 1500 is described using a similar subband configuration as in the scheme 200, and may use the same reference numerals for simplicity's sake. In the scheme 1500, when a UE transmits AUL data inside a BS's TXOP, the UE is allowed to select any AUL resource 1230 in the subbands 202, but prioritizes the BS's acquired subbands 202 over the subbands 202 not acquired by the BS. a highest priority subband 202 acquired by the BS. As shown, the BS performs a CAT4 LBT 1004 in each subband 202. The CAT4 LBTs 1004 in the subbands $202_{SB(1)}$ and $202_{SB(2)}$ passed as shown by the checkmarks, but the CAT4 LBTs 1004 in the subbands $202_{SB(0)}$ and $202_{SB(3)}$ failed as shown by the cross marks. Thus, the BS may gain a TXOP 1502 (e.g., the TXOPs 902, 1002, 1302, and 1402) with acquired subbands $202_{SB(1)}$ and $202_{SB(2)}$.

Similar to the schemes 1300 and 1400, after the UE determines AUL transmission is allowed in the TXOP 1502, the UE performs a CAT2 LBT 1006 in each of the BS's acquired subbands $202_{SB(1)}$ and $202_{SB(2)}$ and a CAT4 LBT 1008 in each of the subband $202_{SB(0)}$ and $202_{SB(3)}$ not acquired by the BS. As shown, the CAT2 LBTs 1006 in the subbands $202_{SB(1)}$ and $202_{SB(2)}$ failed as shown by the cross marks, and the CAT4 LBT 1008 in the subband $202_{SB(0)}$ and $202_{SB(3)}$ passed as shown by the checkmarks. Referring to the scheme 1200, the AUL resources R3 and R6 1230 are available in the subbands $202_{SB(3)}$ and $202_{SB(0)}$, respectively. The UE selects the highest priority AUL resource R3 1230 from the available AUL resources 1230 and transmits AUL data 1312 using the selected AUL resource R3 1230.

The UE may give priority to the BS's acquired subbands 202. For example, if the CAT2 LBT 1006 passes in a BS's acquired subband 202, the UE may select an AUL resource 1230 from the BS's acquired subband 202. The UE may only select an AUL resource 1230 from a subband 202 not acquired by the BS when the UE fails CAT2 LBTs 1006 in all the BS's acquired subbands 202.

For AUL transmission outside the TXOP 1502 of the BS, the UE may perform a CAT4 LBT 1008 in each subband 202 and selects a highest priority AUL resource in the subbands 202 with a CAT4 LBT 1008 pass for AUL transmission. As shown, the UE performs a CAT4 LBT 1008 in each subband 202 outside the TXOP 1502. The CAT4 LBTs 1008 in the subbands $202_{SB(1)}$ and $202_{SB(2)}$ passed as shown by the checkmarks, but the CAT4 LBTs 1008 in the subbands $202_{SB(0)}$ and $202_{SB(3)}$ failed as shown by the cross marks.

Referring to the scheme 1200, the AUL resources R4 and R5 1230 are available in the subbands $202_{SB(2)}$ and $202_{SB(1)}$, respectively. The UE selects the highest priority AUL resource R4 1230 from the available AUL resources 1230 and transmits AUL data 1312 using the selected AUL resource R4 1230. In an embodiment, the UE may prepare multiple copies of the AUL data 1312 according to the available AUL resources 1230 and select the copy of the AUL data 1312 corresponding to the selected AUL resource 1230 for transmission. For example, the UE may prepare a copy of the AUL data 1312 for each potential AUL resource R1, R2, R3, R4, R5, and R6 1230 and select the copy of the AUL data 1312 corresponding to the AUL resource R4 1230 upon the selection of the AUL resource R3 1230 for transmission.

While not shown in FIGS. 13-15, the BS may communicate other UL and/or DL communications within a TXOP 1302, 1402, and/or 1502.

Figure 16:
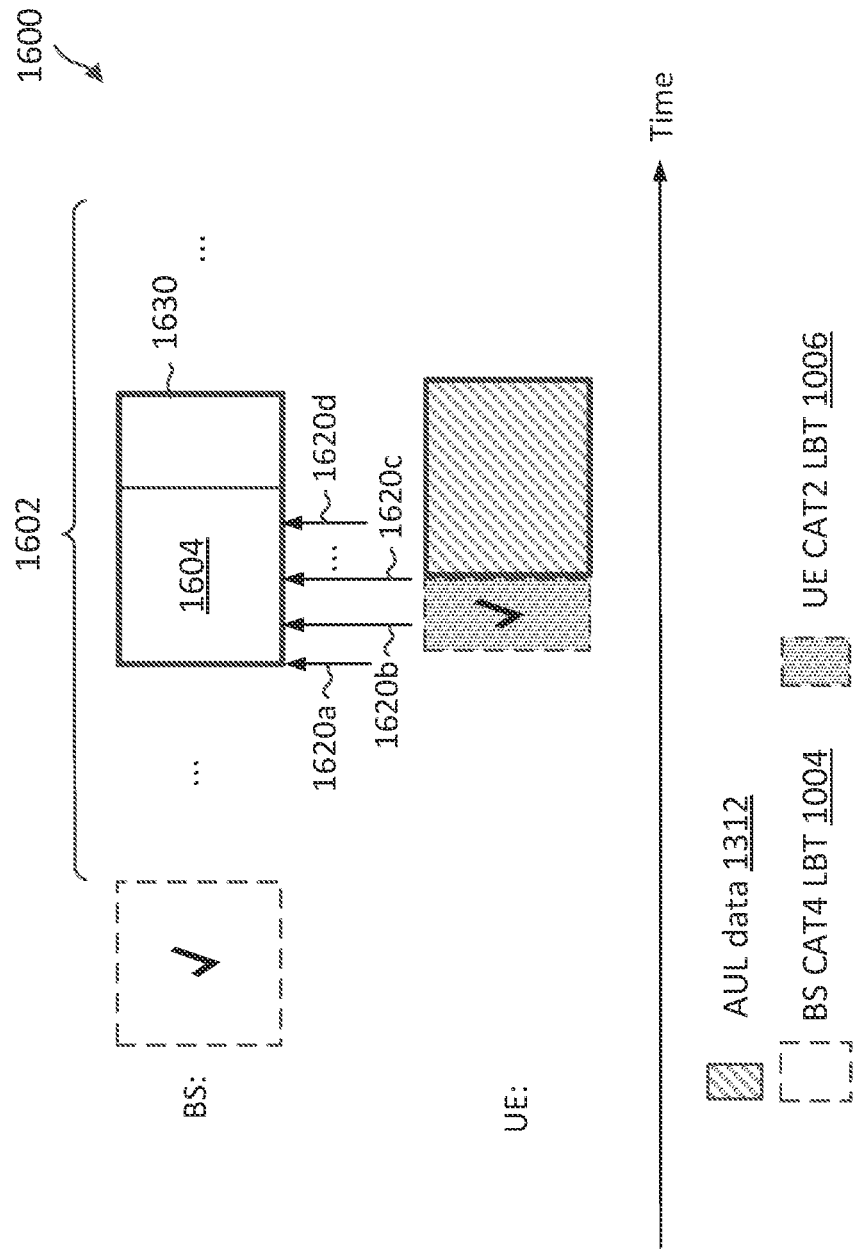
FIG. 16 illustrates an AUL communication scheme with multiple starting time offsets according to some embodiments of the present disclosure.

FIG. 16 illustrates an AUL communication scheme 1600 with multiple starting time offsets according to some embodiments of the present disclosure. The scheme 1600 may be employed by a BS such as the BSs 105 and 400 and a UE such as the UEs 115 and 300 in a network such as the network 100. In particular, a BS may employ the scheme 1600 to configure multiple starting time offsets for AUL communications when operating over a shared spectrum or an unlicensed spectrum. In FIG. 16, the x-axis represents time in some constant units.

In the scheme 1600, a BS may perform a CAT4 LBT 1004 in a channel (e.g., the subbands 202) and gain a TXOP 1602 in the channel. The BS may configure an AUL resource 1630 in the TXOP 1602 (e.g., the TXOPs 902, 1002, 1302, 1402, and 1502). The AUL resource 1630 may correspond to one of the AUL resources R1, R2, R3, R4, R5, or R6 1230. The BS may configure a UE with a set of allowable starting time offsets 1620, for example, within a first symbol 1604 of the AUL resource 1630. The starting time offsets are shown as 1620a, 1602b, 1602c, and 1620d. The starting time offsets 1620 may be spaced apart in time, for example, by about 8 µs, about 9 µs, about 10 µs, about 12 µs, about 24 µs or any suitable time.

The UE selects a starting time offset (e.g., the starting time offset 1620c) from the set of starting time offsets 1620 and performs a CAT2 LBT 1006 based on the selected starting time offset 1620c. If the CAT2 LBT 1006 results in a pass, the UE transmit AUL data 1312 using the AUL resource 1630 beginning at a time indicated by the selected starting time offset 1620c. In an example, the UE may select the starting time offset 1620c based on a random number. The UE may draw a random number between 1 to L when there are L number of starting time offsets 1620 and use the drawn random number as an index into the set of starting time offsets 1620.

In an embodiment, the BS may restrict the UE in the starting time offset selection. For example, a UE may not be allowed to select the first two starting time offsets 1620a and 1620b at the beginning portion of the symbol 1604 so that the BS may schedule another UE for a UL data transmission. Thus, when the BS does use the resource 1630 for a granted or scheduled communication, the UE may detect the scheduled or granted transmission and refrain from accessing the resource 1630.

In an embodiment, the BS may configure the UE with the same set of starting time offsets or a different set of starting time offsets for transmitting AUL data outside of a TXOP of the BS and/or within a TXOP of the BS, but in a subband (e.g., the subbands 202) not acquired by the BS. The UE may perform a CAT4 LBT (e.g., the CAT4 LBT 1008) when using an AUL resource outside of a TXOP of the BS or in a subband not acquired by the BS within a TXOP of the BS. In some other embodiments, the BS may configure different sets of starting time offsets for different AUL resources 1630.

Figure 17:
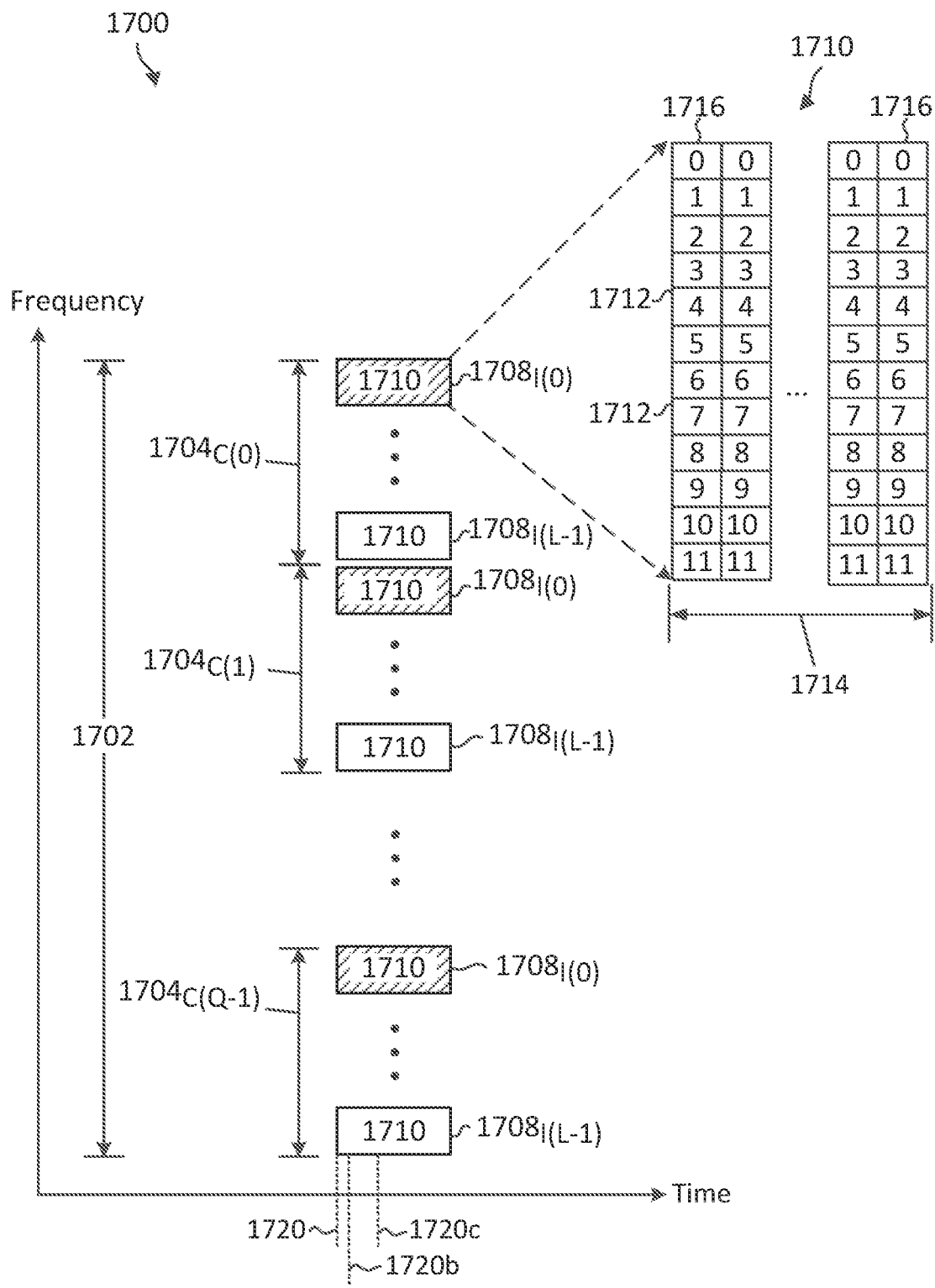
FIG. 17 illustrates an AUL communication scheme using frequency interlaces according to some embodiments of the present disclosure.

FIG. 17 illustrates an AUL communication scheme 1700 using frequency interlaces according to some embodiments of the present disclosure. The scheme 1700 may be employed by a BS such as the BSs 105 and 400 and a UE such as the UEs 115 and 300 in a network such as the network 100. In particular, a BS may employ the scheme 1700 to configure resources for AUL communications using frequency interlaces when operating over a shared spectrum or an unlicensed spectrum. In FIG. 17, the x-axes represent time in some constant units, and the y-axes represent frequency in some constant units. The scheme 1700 includes a frequency band 1702. The frequency band 1702 may have a bandwidth of about 10 megahertz (MHz) or about 20 MHz and a subcarrier spacing (SCS) of about 15 kilohertz (kHz), about 30 kHz, or about 20 kHz. The frequency band 1702 may be located at any suitable frequencies. In some embodiments, the frequency band 1702 may be located at about 3.5 GHz, 6 GHz, or 60 GHz. In some embodiments, the frequency band 1702 may correspond to a system bandwidth or the frequency band 201 described above. The scheme 1700 allocates resources in units of frequency interlaces 1708.

The frequency interlaces are shown as $1708_{I(0)}$ to $1708_{I(L-1)}$, where L is a positive integer. Each frequency interlace 1708 may include Q plurality of RBs 1710 evenly spaced over the frequency band 1702, where L is a positive integer. In other words, the RBs 1710 in a particular frequency interlace $1708_{I(i)}$ are spaced apart from each other by at least one other RB 1710, where i may vary between 0 and L−1. The values of Q and L may vary based on several factors, such as the bandwidth, the subcarrier spacing (SCS), and/or the PSD limitation of the frequency band 1702.

A group of L localized RBs 1710 forms a cluster 1704. As shown, the frequency interlaces $1708_{I(0)}$ to $1708_{I(L-1)}$ form Q clusters $1704_{C(0)}$ to $1704_{C(Q-1)}$. Each RB 1710 may span about twelve contiguous subcarriers 1712 in frequency and a time period 1714. The subcarriers 1712 are indexed from 0 to 11. The time period 1714 may span any suitable number of OFDM symbols 1716. In some embodiments, the time period 1714 may correspond to one transmission time interval (TTI), which may include about fourteen OFDM symbols 1716.

The number of clusters 1704 or the value of Q may be dependent on the amount of frequency distribution required to maintain a certain PSD level. As an example, the scheme 1700 may divide the frequency band 1702 into about ten clusters 1704 (e.g., Q=10) and distribute an allocation over the ten clusters 1704 to increase a frequency occupancy of the allocation. In an embodiment, the frequency band 1702 may have a bandwidth of about 170 MHz and each subcarrier 1712 may span about 15 kHz in frequency. In such an embodiment, the frequency band 1702 may include about ten frequency interlaces 1708 (e.g., L=10). For example, an allocation may include one frequency interlace 1708 having ten distributed or equally spaced RBs 1710. Compared to an allocation with a single RB or ten localized RBs, the interlaced allocation with the ten distributed RBs 1710 allows a UE to transmit at a higher power while maintaining the same PSD level.

In an embodiment, a BS may allocate a full interlace 1708 for a UE to transmit AUL data (e.g., the AUL data 1312). For example, the BS may allocate the interlace $1708_{I(0)}$ to a UE.

The BS may configure a set of starting time offsets 1720 (shown as 1720a, 1720b, and 1720c) similar to the starting time offsets 1620 for beginning an AUL transmission. The UE may randomly select a starting time offset 1720 and transmit AUL data using the frequency interlace $1708_{I(0)}$. In some embodiments, the BS may configure multiple UE with the frequency interlace $1708_{I(0)}$. The random selection of the starting time offset may allow a UE selecting an earlier starting time offset 1720 to block a UE selecting a later starting time offset 1720, and thus reduce collisions among the UEs sharing the same AUL resource (e.g., a frequency interlace 1708).

In another embodiment, a BS may allocate a partial interlace 1708 for a UE to transmit AUL data. For example, the BS may allocate a subset of RBs 1710 in the interlace $1708_{I(0)}$ to a UE. In such an embodiment, the BS may allocate different portions of a frequency interlace 1708 to different UEs and configures the UEs with a single starting time offset 1720. A single starting time offset may allow for a more efficiency usage of the spectrum resources.

FIGS. 18-21 illustrates various mechanisms for configuring and selecting starting timing offsets (e.g., the starting time offsets 1620). In general, a BS may configure a single set of starting time offsets for all AUL resources (e.g., the AUL resources 1230 and 1630) or configure different sets of starting time offsets for different AUL resources independently. In FIGS. 18-21, a BS may configure a first set of starting time offsets for AUL transmissions within a TXOP (e.g., the TXOPs 902, 1002, 1302, 1402, 1502, and 1602) of the BS and a second set of starting time offsets for AUL transmission outside of a TXOP of the BS or within a TXOP of the BS, but in subbands (e.g., the subband 202) not acquired by the BS.

Figure 18:
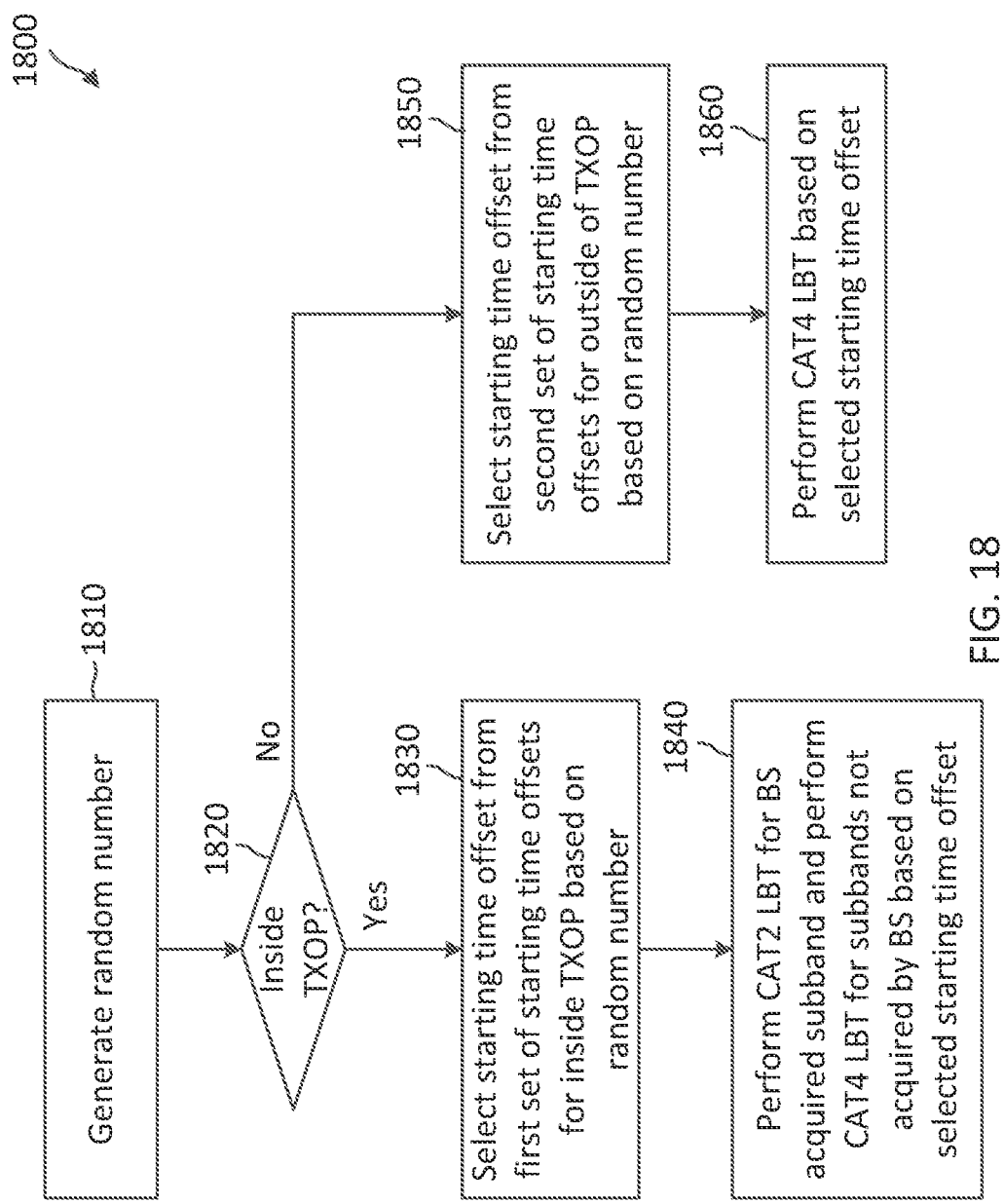
FIG. 18 is a flow diagram of an AUL communication method according to some embodiments of the present disclosure.

FIG. 18 is a flow diagram of an AUL communication method 1800 according to some embodiments of the present disclosure. Steps of the method 1800 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the AUL communication module 309, the transceiver 310, the modem 312, and the one or more antennas 316, to execute the steps of method 1800. The method 1800 may employ similar mechanisms as in the schemes 1200, 1300, 1400, 1500, 1600 and 1700 as described with respect to FIGS. 12, 13, 14, 15, 16, and 17, respectively. As illustrated, the method 1800 includes a number of enumerated steps, but embodiments of the method 1800 may include additional steps before, after, and in between the enumerated steps. In some embodiments, one or more of the enumerated steps may be omitted or performed in a different order. The method 1800 generates a single random number for all available AUL resources (e.g., the AUL resources 1230 and 1630).

At step 1810, the method 1800 includes generating a random number.

At step 1820, the method 1800 includes determining whether an AUL transmission (e.g., the AUL data 1312) is to be transmitted within a TXOP (e.g., the TXOPs 902, 1002, 1302, 1402, 1502, and 1602) of a BS (e.g., the BSs 105 and 400) or outside a TXOP of the BS. When the AUL transmission is to be transmitted within a TXOP of the BS, the method 1800 proceeds to step 1830.

At step 1830, the method 1800 includes selecting a starting time offset from the first set of starting time offsets based on the generated random number.

At step 1840, the method 1800 includes performing a CAT2 LBT (e.g., the CAT2 LBTs 1006) in each BS's acquired subband and performing a CAT4 LBT (e.g., the CAT4 LBTs 1008) in each subband not acquired by the BS based on selected starting time offset. For example, a UE may perform a CAT2 LBT or a CAT4 LBT in a corresponding subband prior to the selected starting time offset. Subsequently, the UE may determine whether to transmit an AUL communication based on the LBT outcomes.

Returning to the step 1820, when the AUL transmission is to be transmitted outside a TXOP of the BS, the method 1800 proceeds to step 1850.

At step 1850, the method 1800 includes selecting a starting time offset from the second set of starting time offsets based on the generated random number.

At step 1860, the method 1800 includes performing a CAT4 LBT in the subbands based on selected starting time offset. Subsequently, the UE may determine whether to transmit an AUL communication based on the LBT outcomes.

Figure 19:
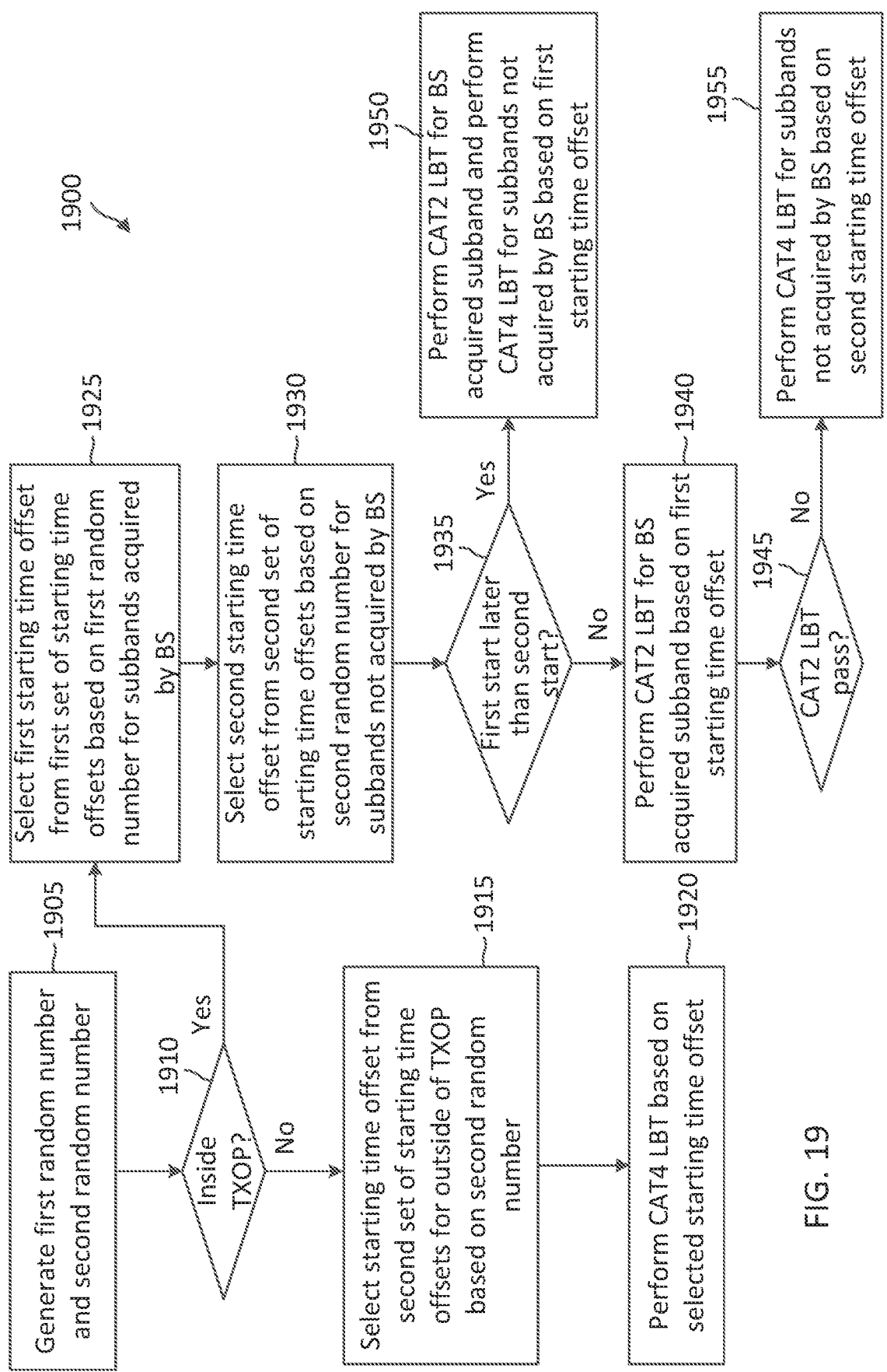
FIG. 19 is a flow diagram of an AUL communication method according to some embodiments of the present disclosure.

FIG. 19 is a flow diagram of an AUL communication method 1900 according to some embodiments of the present disclosure. Steps of the method 1900 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the AUL communication module 309, the transceiver 310, the modem 312, and the one or more antennas 316, to execute the steps of method 1900. The method 1900 may employ similar mechanisms as in the schemes 1200, 1300, 1400, 1500, 1600 and 1700 as described with respect to FIGS. 12, 13, 14, 15, 16, and 17, respectively. As illustrated, the method 1900 includes a number of enumerated steps, but embodiments of the method 1900 may include additional steps before, after, and in between the enumerated steps. In some embodiments, one or more of the enumerated steps may be omitted or performed in a different order. The method 1900 generates one random number for AUL resources (e.g., the AUL resources 1230 and 1630) in subbands acquired by a BS (e.g., the BSs 105 and 400) in a TXOP of the BS and another random number for AUL resources outside a TXOP of a BS and AUL resources inside a TXOP of the BS, but in subbands not acquired by the BS.

At step 1905, the method 1900 includes generating a first random number and a second random number.

At step 1910, the method 1900 includes determining whether an AUL transmission (e.g., the AUL data 1312) is to be transmitted within a TXOP (e.g., the TXOPs 902, 1002, 1302, 1402, 1502, and 1602) of a BS (e.g., the BSs 105 and 400) or outside a TXOP of the BS. When the AUL transmission is to be transmitted outside a TXOP of the BS, the method 1900 proceeds to step 1915.

At step 1915, the method 1900 includes selecting a starting time offset from the second set of starting time offsets based on the second random number.

At step 1920, the method 1900 includes performing a CAT4 LBT (e.g., the CAT4 LBTs 1008) in each subband based on selected starting time offset. For example, a UE may perform a CAT4 LBT in a corresponding subband prior to the selected starting time offset. Subsequently, the UE may determine whether to transmit an AUL communication based on the LBT outcomes.

Returning to the step 1910, when the AUL transmission is to be transmitted inside a TXOP of the BS, the method 1900 proceeds to step 1925.

At step 1925, the method 1900 includes selecting a first starting time offset from the first set of starting time offsets based on the first random number for subbands acquired by the BS.

At step 1930, the method 1900 includes selecting a second starting time offset from the second set of starting time offsets based on the second random number for subbands not acquired by the BS.

At step 1935, the method 1900 includes determining whether the first starting time offset is later than the second starting time offset. When the first starting time offset is not later than the second starting time offset, the method 1900 proceeds to step 1945.

At step 1940, the method 1900 includes performing a CAT2 LBT (e.g., the CAT2 LBTs 1006) in each BS's acquired subband based on selected first starting time offset. Subsequently, the UE may determine whether to transmit an AUL communication based on the LBT outcomes.

At step 1945, the method 1900 includes determining whether any of the CAT2 LBTs passes. When a CAT2 LBT pass, the method 1900 may transmit an AUL communication using a corresponding AUL resource. When no CAT2 LBT passes, the method 1900 proceeds to step 1955.

At step 1955, the method 1900 includes performing a CAT4 LBT in each subband not acquired by the BS based on the selected second starting offset.

Returning to the step 1935, when the first starting time offset is later than the second starting time offset, the method 1900 proceeds to step 1950.

At step 1950, the method 1900 includes performing a CAT2 LBT in each subband acquired by the BS and performing a CAT4 LBT in each subband not acquired by the BS based on the first starting offset. In other words, the method 1900 delays the second starting time offset selected for subbands not acquired by the BS to the first starting time offset selected for subbands acquired by the BS. Thus, the UE may give priority to subbands acquired by the BS when a CAT2 LBT passes.

Figure 20:
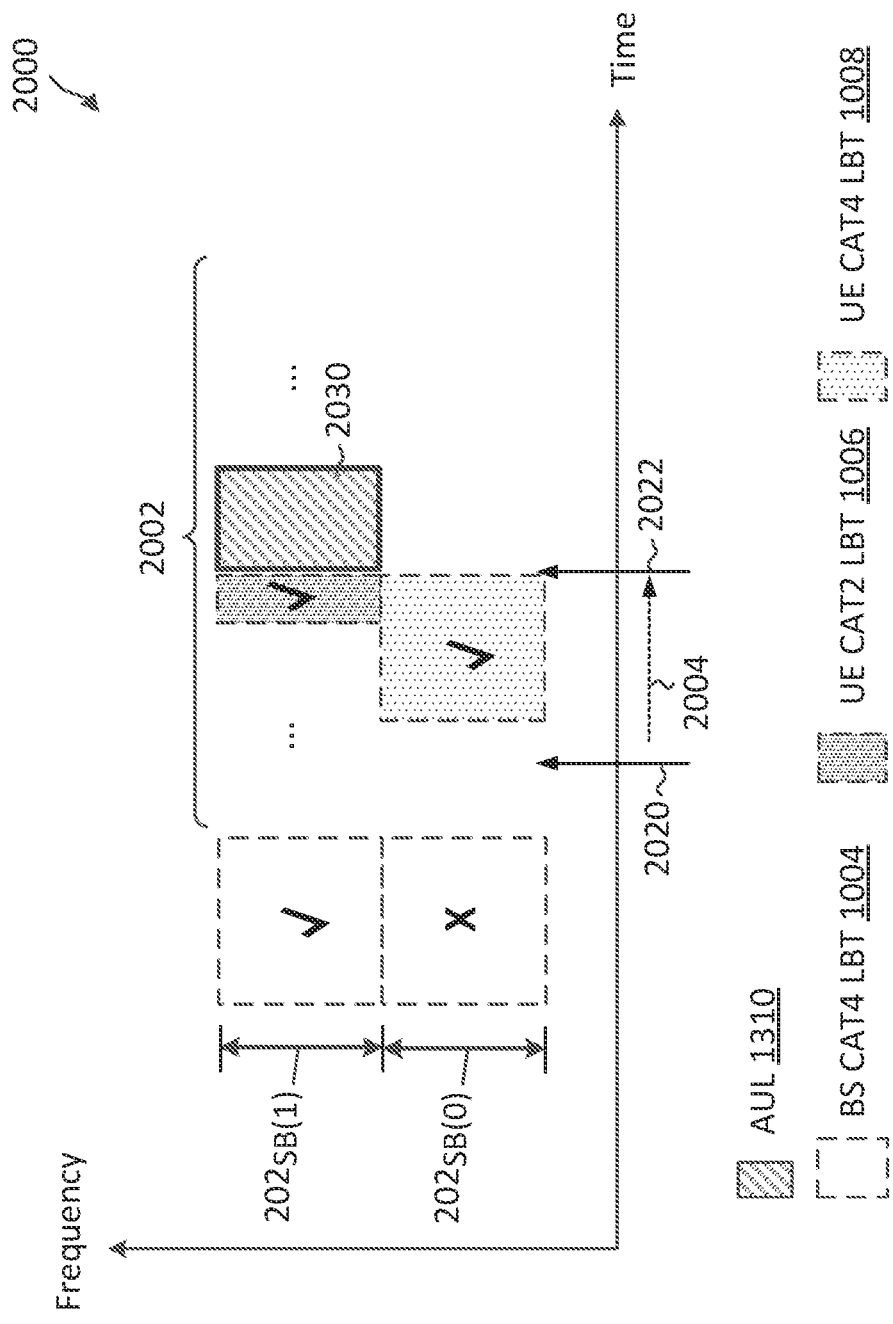
FIG. 20 illustrates an AUL communication scheme according to some embodiments of the present disclosure.

FIG. 20 illustrates an AUL communication scheme 2000 according to some embodiments of the present disclosure. The scheme 2000 may be employed by a BS such as the BSs 105 and 400 and a UE such as the UEs 115 and 300 in a network such as the network 100. In particular, a BS may employ the scheme 2000 to communicate AUL communications with a UE with multiple configured starting offsets when operating over a shared spectrum or an unlicensed spectrum. In FIG. 20, the x-axis represents time in some constant units, and the y-axis represents frequency in some constant units. The scheme 2000 is similar to the method 1900. The scheme 2000 is described using a similar subband configuration as in the scheme 200, and may use the same reference numerals for simplicity's sake.

In the scheme 2000, a BS passes a CAT4 LBT 1004 in the subband $202_{SB(1)}$ as shown by the checkmark and fails a CAT4 LBT 1004 in the subband $202_{SB(0)}$ as shown by the cross mark. The UE determines that AUL transmission is allowed in a TXOP 2002 (e.g., the TXOPs 902, 1002, 1302, 1402, 1502, and 1602) of the BS. The UE selects a starting time offset 2020 for the subband $202_{SB(0)}$ not acquired by the BS and selects a starting time offset 2022 for the subband $202_{SB(1)}$ acquired by the BS. As shown, the starting time offset 2020 for the subband $202_{SB(0)}$ not acquired by the BS is earlier than the starting time offset 2022 for the subband $202_{SB(1)}$ acquired by the BS. Thus, the UE delays until the starting time offset 2022 to the time of the starting time offset 2020 as shown by the dotted arrow 2004. The UE performs a CAT4 LBT 1008 in the subband $202_{SB(0)}$ and a CAT2 LBT 1006 in the subband $202_{SB(1)}$ based on the starting time offset 2022. For example, the both the CAT2 LBT 1006 and the CAT4 LBT 1008 pass, the UE gives priority to the subband $202_{SB(1)}$ acquired by the BS and transmits AUL data 1312 using an AUL resource 2030 (e.g., the AUL resources 1230 and 1630) in the subband $202_{SB(1)}$.

Figure 21:
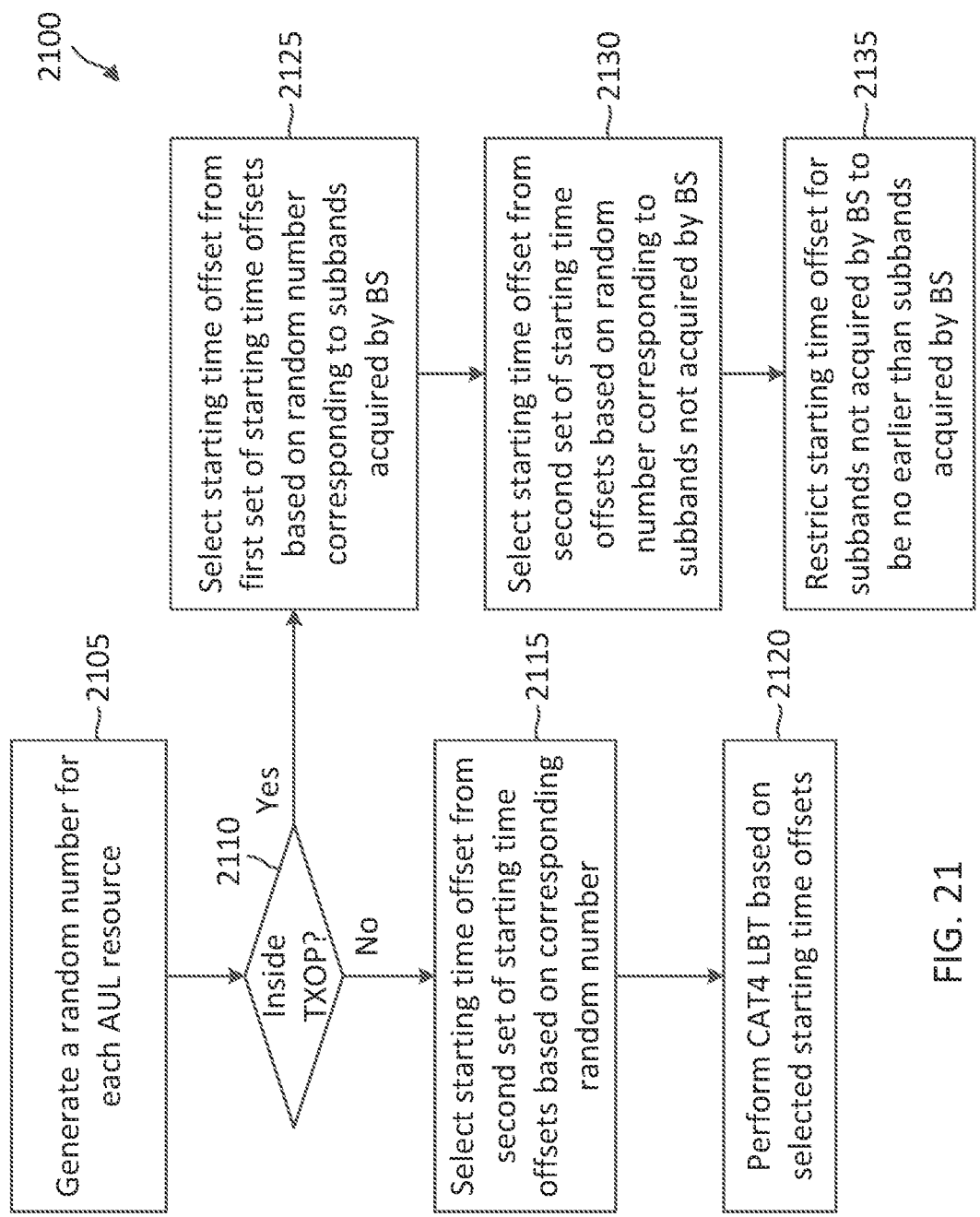
FIG. 21 is a flow diagram of an AUL communication method according to some embodiments of the present disclosure.

FIG. 21 is a flow diagram of an AUL communication method 2100 according to some embodiments of the present disclosure. Steps of the method 2100 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the AUL communication module 309, the transceiver 310, the modem 312, and the one or more antennas 316, to execute the steps of method 2100. The method 2100 may employ similar mechanisms as in the schemes 1200, 1300, 1400, 1500, 1600 and 1700 as described with respect to FIGS. 12, 13, 14, 15, 16, and 17, respectively. As illustrated, the method 2100 includes a number of enumerated steps, but embodiments of the method 2100 may include additional steps before, after, and in between the enumerated steps. In some embodiments, one or more of the enumerated steps may be omitted or performed in a different order. The method 2100 generates a random number for each AUL resources (e.g., the AUL resources 1230, 1630, and 2230).

At step 2105, the method 2100 includes generating a random number for each AUL resource.

At step 2110, the method 2100 includes determining whether an AUL transmission (e.g., the AUL data 1312) is to be transmitted within a TXOP (e.g., the TXOPs 902, 1002, 1302, 1402, 1502, 1602, and 2002) of a BS (e.g., the BSs 105 and 400) or outside a TXOP of the BS. When the AUL transmission is to be transmitted outside a TXOP of the BS, the method 2100 proceeds to step 2115.

At step 2115, the method 2100 includes selecting a starting time offset from the second set of starting time offsets for each subband or each AUL resource based on a corresponding selected random number.

At step 2120, the method 2100 includes performing a CAT4 LBT (e.g., the CAT4 LBTs 1008) in each subband based on a corresponding selected starting time offset. Subsequently, the UE may determine whether to transmit an AUL communication based on the LBT outcomes.

Returning to the step 2125, when when the AUL transmission is to be transmitted outside a TXOP of the BS, the method 2100 proceeds to step 2125.

At step 2125, the method 2100 includes selecting a starting time offset from the first set of starting time offsets for each BS's acquired subband based on a corresponding selected random number.

At step 2130, the method 2100 includes selecting a starting time offset from the second set of starting time offsets for each subband not acquired by the BS based on a corresponding selected random number.

At step 2135, the method 2100 includes restricting the starting time offsets such that starting time offsets for subbands not acquired by the BS are not earlier than the starting time offsets for subbands acquired by the BS similar to the method 1900 and the scheme 2000.

In general, a BS and a UE may use any suitable combinations of the schemes 1200, 1300, 1400, 1500, 1600, 1700, 2000 described above with respect to FIGS. 12, 13, 14, 15, 16, 17, and 2000, respectively, and the methods 1800, 1900, and 2100 described above with respect to FIGS. 18, 19, and 21, respectively, for AUL communications. The BS may configure multiple redundant frequency resources (e.g., the AUL resources 1230, 1630, 2030 and full and/or partial frequency interlaces 1708) in different subbands (e.g., the subbands 202) and associate the AUL resources with a priority order. The priority order may be UE specific and may be different for different UEs. The UE may select an AUL resource outside a TXOP of the BS for AUL transmission based on an AUL resource priority order and LBT outcomes. For inside a TXOP of the BS, the priority may be a function of whether the subband is acquired by the BS and/or indicated as available for AUL transmissions. The BS may restrict the UE to transmit only within subbands acquired by the BS and/or indicated available for AUL transmissions. The BS may further restrict the UE to transmit using highest priority resource that is available within subbands acquired by the BS and/or indicated as available for AUL transmissions by the BS. The BS may configure a single set of starting time offsets (e.g., the starting time offsets 1620) for all AUL resources or different sets of starting time offsets depending on whether the AUL resource is within a TXOP of the BS and/or within a subband acquired by the BS. The BS may configured the UE with different configuration for applying a random selection starting offsets.

Figure 22:
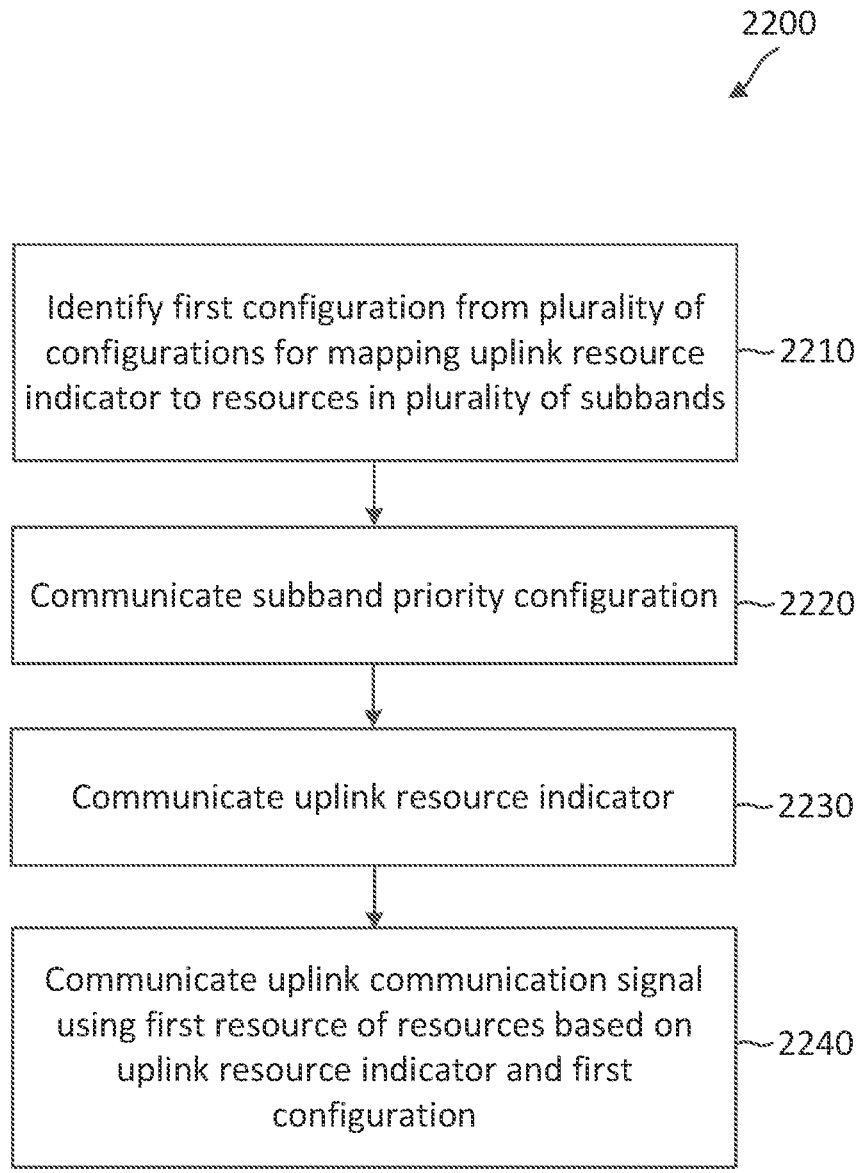
FIG. 22 is a flow diagram of a UL control channel communication method according to some embodiments of the present disclosure.

FIG. 22 is a flow diagram of a UL control channel communication method 2200 according to some embodiments of the present disclosure. Steps of the method 2200 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the AUL communication module 309, the transceiver 310, the modem 312, and the one or more antennas 316, to execute the steps of method 2200. In another example, a wireless communication device, such as the BS 105 or BS 400, may utilize one or more components, such as the processor 402, the memory 404, the AUL communication module 409, the transceiver 410, the modem 412, and the one or more antennas 416, to execute the steps of method 2200. The method 2200 may employ similar mechanisms as in the schemes 200, 500, 600, 700, 800, 1000, and 1100 as described with respect to FIGS. 2, 5, 6, 7, 8, 10, and 11, respectively and the method 900 as described with respect to FIG. 9. As illustrated, the method 2200 includes a number of enumerated steps, but embodiments of the method 2200 may include additional steps before, after, and in between the enumerated steps. In some embodiments, one or more of the enumerated steps may be omitted or performed in a different order.

At step 2210, the method 2200 includes identifying, by a first wireless communication device, a first configuration from a plurality of configurations for mapping an uplink resource indicator (e.g., the UL control resource indicators 220, 520, 620, 720, 820, and 1020) to resources (e.g., the UL control resources 230, 530, 630, 730, 830, 1030, and 1130) in a plurality of subband (e.g., the subbands 202). The configurations may correspond to the mapping options 0, 1, 2, 3, 4, and 5 described above in the method 900 or the UL control resource indicator mappings describe above in the schemes 200, 500, 600, 700, and 800.

At step 2220, the method 2200 includes communicating, by the first wireless communication device with a second wireless communication device, a subband priority configuration.

At step 2230, the method 2200 includes communicating, by the first wireless communication device with a second wireless communication device, the uplink resource indicator.

At step 2240, the method 2200 includes communicating, by the first wireless communication device with the second wireless communication device, an uplink communication signal (e.g., the UL control information 1012) using a first resource of the resources based on the uplink resource indicator, the subband priority configuration, and the first configuration.

In an embodiment, the first wireless communication device corresponds to a BS and the second wireless communication device corresponds to a UE. The uplink resource indicator is transmitted by the first wireless communication device to the second wireless communication device. The uplink communication signal is received by the first wireless communication device from the second wireless communication device.

In an embodiment, the first wireless communication device corresponds to a UE and the second wireless communication device corresponds to a BS. The uplink resource indicator is received by the first wireless communication device from the second wireless communication device. The uplink communication signal is transmitted by the first wireless communication device to the second wireless communication device.

Figure 23:
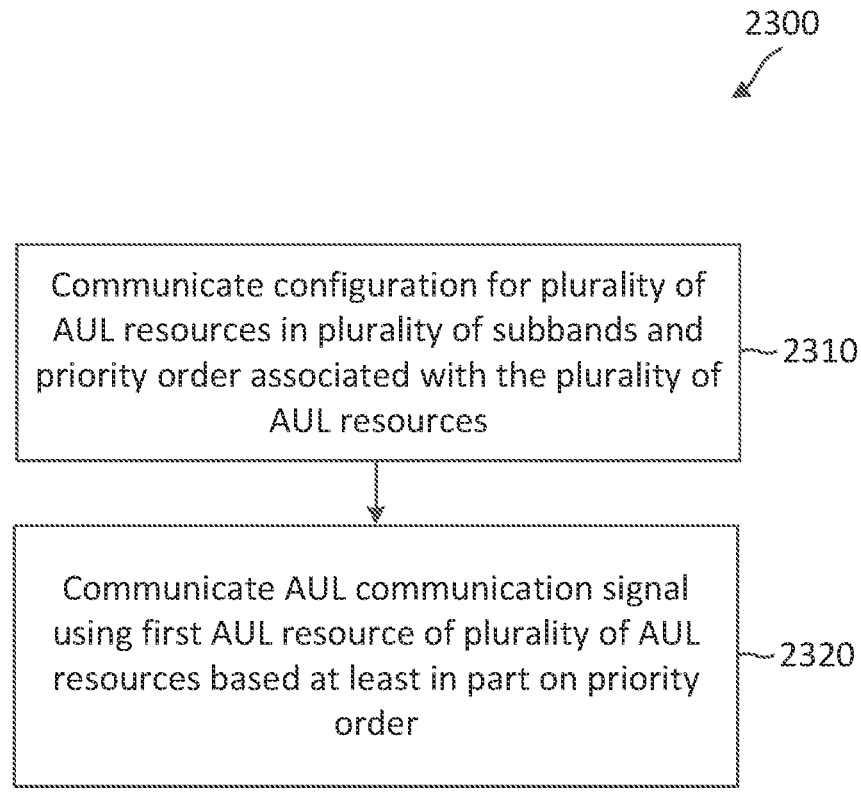
FIG. 23 is a flow diagram of an AUL communication method according to some embodiments of the present disclosure.

FIG. 23 is a flow diagram of an AUL communication method 2300 according to some embodiments of the present disclosure. Steps of the method 2300 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the AUL communication module 309, the transceiver 310, the modem 312, and the one or more antennas 316, to execute the steps of method 2300. In another example, a wireless communication device, such as the BS 105 or BS 400, may utilize one or more components, such as the processor 402, the memory 404, the AUL communication module 409, the transceiver 410, the modem 412, and the one or more antennas 416, to execute the steps of method 2300. The method 2300 may employ similar mechanisms as in the schemes 1200, 1300, 1400, 1500, 1600, 1700, and 2000 as described with respect to FIGS. 12, 13, 14, 15, 16, 17, and 20, respectively, and the methods 1800, 1900, and 2100 described above with respect to FIGS. 18, 190, and 21, respectively. As illustrated, the method 2300 includes a number of enumerated steps, but embodiments of the method 2300 may include additional steps before, after, and in between the enumerated steps. In some embodiments, one or more of the enumerated steps may be omitted or performed in a different order.

At step 2310, the method 2300 includes communicating, by a first wireless communication device with a second wireless communication device, a configuration for a plurality of AUL resources (e.g., the AUL resources 1230, 1630, and 2030 and the full and/or partial frequency interlaces 1708) in a plurality of subbands (e.g., the subbands 202) and a priority order associated with the plurality of AUL resources.

At step 2320, the method 2300 includes communicating, by the first wireless communication device with the second wireless communication device, an AUL communication signal using a first AUL resource of the plurality of AUL resources based at least in part on the priority order.

In an embodiment, the first wireless communication device corresponds to a BS and the second wireless communication device corresponds to a UE. The configuration resource indicator is transmitted by the first wireless communication device to the second wireless communication device. The AUL communication signal is received by the first wireless communication device from the second wireless communication device.

In an embodiment, the first wireless communication device corresponds to a UE and the second wireless communication device corresponds to a BS. The configuration is received by the first wireless communication device from the second wireless communication device. The AUL communication signal is transmitted by the first wireless communication device to the second wireless communication device.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication including identifying, by a first wireless communication device, a first configuration from a plurality of configurations for mapping an uplink resource indicator to resources in a plurality of subbands. The method may also include of wireless communication includes communicating, by the first wireless communication device with a second wireless communication device, a subband priority configuration. The method may also include of wireless communication includes communicating, by the first wireless communication device with the second wireless communication device, the uplink resource indicator. The method may also include of wireless communication includes communicating, by the first wireless communication device with the second wireless communication device, an uplink communication signal using a first resource of the resources based on the uplink resource indicator, the subband priority configuration, and the first configuration.

In some aspects, the method may also include where the uplink resource indicator is an acknowledgement resource indicator (ARI), and where the communicating the uplink communication signal includes communicating, by the first wireless communication device with the second wireless communication device, an acknowledgement/not-acknowledgement (ACK/NACK) feedback using the first resource. The communicating the uplink communication signal includes transmitting, by the first wireless communication device to the second wireless communication device, the uplink communication signal in a first subband of the plurality of subbands. The identifying is based on whether the uplink communication signal is to be transmitted within a transmission opportunity (TXOP) of the second wireless communication device or outside a TXOP of the second wireless communication device. The communicating the uplink communication signal includes receiving, by the first wireless communication device from the second wireless communication device, the uplink communication signal. The method may also include communicating, by the first wireless communication device with the second wireless communication device, a message indicating a rule for identifying the first configuration from the plurality of configurations. The method may also include communicating, by the first wireless communication device with the second wireless communication device, a message indicating the first configuration. The first configuration indicates that the uplink resource indicator includes a set of bits identifying a resource in a subset of the resources in the plurality of subbands, and where the first resource corresponds to the identified resource. The communicating the uplink resource indicator includes communicating, by the first wireless communication device with the second wireless communication device, the uplink resource indicator in a first subband of the plurality of subbands, where the first configuration indicates that the uplink resource indicator includes a set of bits identifying a resource within the first subband used for communicating the uplink resource indicator, and where the first resource corresponds to the identified resource. The first configuration indicates that the uplink resource indicator includes a first set of bits identifying a first subband of the plurality of subbands; and a second set of bits identifying a resource within the first subband, and where the first resource corresponds to the identified resource within the first subband. The first configuration further indicates that the uplink resource indicator includes a set of bits identifying a resource within a subband of the plurality of subbands and that the identified resource is repeated in each subband of the plurality of subbands, and where the first resource corresponds to the identified resource in a first subband of the plurality of subbands. The first configuration indicates that the uplink resource indicator includes a first set of bits identifying at least a first subband and a second subband of the plurality of subbands; and a second set of bits identifying a resource in the first subband and a resource in the second subband, and where the first resource corresponds to the identified resource in the first subband. The first configuration indicates that the uplink resource indicator includes a set of bits identifying a resource within the first subband and repeated in the second subband, and where the first resource corresponds to the identified resource in the first subband. The communicating the uplink resource indicator includes communicating, by the first wireless communication device with the second wireless communication device, a downlink control information (DCI) message including the uplink resource indicator. The communicating the uplink communication signal includes transmitting, by the first wireless communication device to the second wireless communication device, the uplink communication signal using the first resource in a first subband of the plurality of subbands based on a listen-before-talk (LBT) in the plurality of subbands. The method may also include monitoring, by the first wireless communication device, for a subband acquisition indication from the second wireless communication device in the plurality of subbands; and determining, by the first wireless communication device, whether to perform the LBT in a category 2 LBT mode or a category 4 LBT mode based on whether a subband acquisition indication message is received from the second wireless communication device. The uplink resource indicator indicates at least the first resource in the first subband and a second resource in a second subband of the plurality of subbands based on the first configuration, and where the transmitting the uplink communication signal in the first subband is further based on a priority order of the first subband and the second subband. The priority order is based on at least one of the subband priority configuration or a subband acquisition indication status in each subband of the plurality of subbands determined from the monitoring. The first wireless communication device and the second wireless communication device are located within a cell, and where the subband priority configuration is based on a cell index of the cell.

Further embodiments of the present disclosure include a method of wireless communication including communicating, by a first wireless communication device with a second wireless communication device, a configuration for a plurality of autonomous uplink (AUL) resources in a plurality of subbands and a priority order associated with the plurality of AUL resources; and communicating, by the first wireless communication device with the second wireless communication device, an AUL communication signal using a first AUL resource of the plurality of AUL resources based at least in part on the priority order.

In some aspects, the method may also include selecting, by the first wireless communication device, the first AUL resource based on the priority order. The communicating the AUL communication signal includes receiving, by the first wireless communication device from the second wireless communication device, the AUL communication signal. The communicating the AUL communication signal includes transmitting, by the first wireless communication device to the second wireless communication device, the AUL communication signal using the first AUL resource in one or more subbands of the plurality of subbands based on a listen-before-talk (LBT). The method may also include monitoring, by the first wireless communication device, for a subband acquisition indication from the second wireless communication device. The monitoring includes detecting, by the first wireless communication device, a subband acquisition indication, where the communicating the AUL communication signal is further based on the detecting. The communicating the AUL communication signal is based on the first starting time offset. The selecting includes excluding, by the first wireless communication device, one or more starting time offsets of the first set of starting time offsets based on the detecting. The selecting includes identifying, by the first wireless communication device, the first set of starting time offsets from multiple sets of starting time offsets based on the monitoring. The first AUL resource is in at least one of the first subband or the second subband. The first set of starting time offsets are different from the second set of starting time offsets. The selecting the first starting time offset is further based on a first random number, and where the selecting the second starting time offset is further based on a second random number. The first random number is different from the second random number.

Further embodiments of the present disclosure include an apparatus including a processor configured to identify a first configuration from a plurality of configurations for mapping an uplink resource indicator to resources in a plurality of subbands. The apparatus may also include a transceiver configured to communicate, with a wireless communication device, a subband priority configuration; communicate, with the wireless communication device, the uplink resource indicator; and communicate, with the wireless communication device, an uplink communication signal using a first resource of the resources based on the uplink resource indicator, the subband priority configuration, and the first configuration.

In some aspects, the apparatus may also include where the uplink resource indicator is an acknowledgement resource indicator (ARI), and where transceiver is further configured to communicate the uplink communication signal by communicating, with the wireless communication device, an acknowledgement/not-acknowledgement (ACK/NACK) feedback using the first resource. The transceiver is further configured to communicate the uplink communication signal by transmitting, to the wireless communication device, the uplink communication signal in a first subband of the plurality of subbands. The processor is further configured to identify the first configuration based on whether the uplink communication signal is to be transmitted within a transmission opportunity (TXOP) of the wireless communication device or outside a TXOP of the wireless communication device. The transceiver is further configured to communicate the uplink communication signal by receiving, from the wireless communication device, the uplink communication signal. The transceiver is further configured to communicate, with the wireless communication device, a message indicating a rule for identifying the first configuration from the plurality of configurations. The transceiver is further configured to communicate, with the wireless communication device, a message indicating the first configuration. The first configuration indicates that the uplink resource indicator includes a set of bits identifying a resource in a subset of the resources in the plurality of subbands, and where the first resource corresponds to the identified resource. The transceiver is further configured to communicate, with the wireless communication device, the uplink resource indicator in a first subband of the plurality of subbands, where the first configuration indicates that the uplink resource indicator includes a set of bits identifying a resource within the first subband used for communicating the uplink resource indicator, and where the first resource corresponds to the identified resource. The first configuration indicates that the uplink resource indicator includes a first set of bits identifying a first subband of the plurality of subbands; and a second set of bits identifying a resource within the first subband, and where the first resource corresponds to the identified resource within the first subband. The first configuration further indicates that the uplink resource indicator includes a set of bits identifying a resource within a subband of the plurality of subbands and that the identified resource is repeated in each subband of the plurality of subbands, and where the first resource corresponds to the identified resource in a first subband of the plurality of subbands. The first configuration indicates that the uplink resource indicator includes a first set of bits identifying at least a first subband and a second subband of the plurality of subbands; and a second set of bits identifying a resource in the first subband and a resource in the second subband, and where the first resource corresponds to the identified resource in the first subband. Transceiver is further configured to communicate, with the wireless communication device, a message indicating at least a first subband and a second subband of the plurality of subbands associated with the first configuration, where the first configuration indicates that the uplink resource indicator includes a set of bits identifying a resource within the first subband and repeated in the second subband, and where the first resource corresponds to the identified resource in the first subband. Transceiver is further configured to communicate the uplink resource indicator by communicating, with the wireless communication device, a downlink control information (DCI) message including the uplink resource indicator. Transceiver is further configured to communicate the uplink communication signal by transmitting, to the wireless communication device, the uplink communication signal using the first resource in a first subband of the plurality of subbands based on a listen-before-talk (LBT) in the plurality of subbands. The processor is further configured to monitor for a subband acquisition indication from the wireless communication device in the plurality of subbands; and determine whether to perform the LBT in a category 2 LBT mode or a category 4 LBT mode based on whether a subband acquisition indication message is received from the wireless communication device. The uplink resource indicator indicates at least the first resource in the first subband and a second resource in a second subband of the plurality of subbands based on the first configuration, and where the transceiver is further configured to transmit the uplink communication signal in the first subband further based on a priority order of the first subband and the second subband. The processor is further configured to monitor for a subband acquisition indication from the wireless communication device in the plurality of subbands, where the priority order is based on at least one of the subband priority configuration or a subband acquisition indication status in each subband of the plurality of subbands determined from the monitoring. The apparatus may also include and the wireless communication device are located within a cell, and where the subband priority configuration is based on a cell index of the cell.

Further embodiments of the present disclosure include an apparatus including a transceiver configured to communicate, with a wireless communication device, a configuration for a plurality of autonomous uplink (AUL) resources in a plurality of subbands and a priority order associated with the plurality of AUL resources; and communicate, with the wireless communication device, an AUL communication signal using a first AUL resource of the plurality of AUL resources based at least in part on the priority order.

In some aspects, the apparatus may also include a processor configured to select the first AUL resource based on the priority order. Transceiver is further configured to communicate the AUL communication signal by receiving, from the wireless communication device, the AUL communication signal. The transceiver is further configured to communicate the AUL communication signal by transmitting, to the wireless communication device, the AUL communication signal using the first AUL resource in one or more subbands of the plurality of subbands based on a listen-before-talk (LBT). The apparatus may also include a processor configured to monitor for a subband acquisition indication from the wireless communication device. The processor is further configured to monitor for the subband acquisition indication by detecting a subband acquisition indication, and where transceiver is further configured to communicate the AUL communication signal based on the detection. The transceiver is further configured to communicate the AUL communication signal based on the first starting time offset. The processor is further configured to detect a subband acquisition indication from the wireless communication device; and select the first starting time offset by excluding one or more starting time offsets of the first set of starting time offsets based on the detecting. The processor is further configured to monitor for a subband acquisition indication from the wireless communication device, select the first starting time offset by identifying the first set of starting time offsets from multiple sets of starting time offsets based on the monitoring. The processor is further configured to detect a subband acquisition indication from the wireless communication device in a first subband of the plurality of subbands; determine that no subband acquisition indication is received from the wireless communication device in a second subband of the plurality of subbands different from the first subband; select a second starting time offset from a second set of starting time offsets, the second starting time offset being earlier in time than the first starting time offset; perform a listen-before-talk (LBT) in the first subband based on the first starting time offset; and perform an LBT in the second subband based on the first starting time offset when the second starting time offset is earlier in time than the first starting time offset, where the first AUL resource is in at least one of the first subband or the second subband. The first set of starting time offsets are different from the second set of starting time offsets. The processor is further configured to select the first starting time offset based on a first random number; and select the second starting time offset based on a second random number. The first random number is different from the second random number.

Further embodiments of the present disclosure include a computer-readable medium having program code recorded thereon. The computer-readable medium includes code for causing a first wireless communication device to identify a first configuration from a plurality of configurations for mapping an uplink resource indicator to resources in a plurality of subbands. The computer-readable medium includes code for causing the first wireless communication device to communicate, with a second wireless communication device, a subband priority configuration. The computer-readable medium includes code for causing the first wireless communication device to communicate, with the second wireless communication device, the uplink resource indicator. The computer-readable medium includes code for causing the first wireless communication device to communicate, with the second wireless communication device, an uplink communication signal using a first resource of the resources based on the uplink resource indicator, the subband priority configuration, and the first configuration.

In some aspects, the computer-readable medium includes where the uplink resource indicator is an acknowledgement resource indicator (ARI), and where the code for causing the first wireless communication device to communicate the uplink communication signal is further configured to communicate, with the second wireless communication device, an acknowledgement/not-acknowledgement (ACK/NACK) feedback using the first resource. The code for causing the first wireless communication device to communicate the uplink communication signal is further configured to transmitting, to the second wireless communication device, the uplink communication signal in a first subband of the plurality of subbands. The code for causing the first wireless communication device to identify is further configured to identify the first configuration based on whether the uplink communication signal is to be transmitted within a transmission opportunity (TXOP) of the second wireless communication device or outside a TXOP of the second wireless communication device. The code for causing the first wireless communication device to communicate the uplink communication signal is further configured to receive, from the second wireless communication device, the uplink communication signal. The computer-readable medium code for causing the first wireless communication device to communicate, with the second wireless communication device, a message indicating a rule for identifying the first configuration from the plurality of configurations. The computer-readable medium code for causing the first wireless communication device to communicate, with the second wireless communication device, a message indicating the first configuration. The first configuration indicates that the uplink resource indicator includes a set of bits identifying a resource in a subset of the resources in the plurality of subbands, and where the first resource corresponds to the identified resource. The code for causing the first wireless communication device to communicate the uplink resource indicator is further configured to communicate, with the second wireless communication device, the uplink resource indicator in a first subband of the plurality of subbands, where the first configuration indicates that the uplink resource indicator includes a set of bits identifying a resource within the first subband used for communicating the uplink resource indicator, and where the first resource corresponds to the identified resource. The first configuration indicates that the uplink resource indicator includes a first set of bits identifying a first subband of the plurality of subbands; and a second set of bits identifying a resource within the first subband, and where the first resource corresponds to the identified resource within the first subband. The first configuration further indicates that the uplink resource indicator includes a set of bits identifying a resource within a subband of the plurality of subbands and that the identified resource is repeated in each subband of the plurality of subbands, and where the first resource corresponds to the identified resource in a first subband of the plurality of subbands. The first configuration indicates that the uplink resource indicator includes a first set of bits identifying at least a first subband and a second subband of the plurality of subbands; and a second set of bits identifying a resource in the first subband and a resource in the second subband, and where the first resource corresponds to the identified resource in the first subband. The first configuration indicates that the uplink resource indicator includes a set of bits identifying a resource within the first subband and repeated in the second subband, and where the first resource corresponds to the identified resource in the first subband. The code for causing the first wireless communication device to communicate the uplink resource indicator is further configured to communicate, with the second wireless communication device, a downlink control information (DCI) message including the uplink resource indicator. The code for causing the first wireless communication device to communicate the uplink communication signal is further configured to transmit, to the second wireless communication device, the uplink communication signal using the first resource in a first subband of the plurality of subbands based on a listen-before-talk (LBT) in the plurality of subbands. The computer-readable medium code for causing the first wireless communication device to monitor for a subband acquisition indication from the second wireless communication device in the plurality of subbands; and code for causing the first wireless communication device to determine whether to perform the LBT in a category 2 LBT mode or a category 4 LBT mode based on whether a subband acquisition indication message is received from the second wireless communication device. The uplink resource indicator indicates at least the first resource in the first subband and a second resource in a second subband of the plurality of subbands based on the first configuration, and where the transmitting the uplink communication signal in the first subband is further based on a priority order of the first subband and the second subband. The priority order is based on at least one of the subband priority configuration or a subband acquisition indication status in each subband of the plurality of subbands determined from the monitoring. The first wireless communication device and the second wireless communication device are located within a cell, and where the subband priority configuration is based on a cell index of the cell.

Further embodiments of the present disclosure include a computer-readable medium having program code recorded thereon. The computer-readable medium includes code for causing a first wireless communication device to communicate, with a second wireless communication device, a configuration for a plurality of autonomous uplink (AUL) resources in a plurality of subbands and a priority order associated with the plurality of AUL resources; and code for causing the first wireless communication device to communicate, with the second wireless communication device, an AUL communication signal using a first AUL resource of the plurality of AUL resources based at least in part on the priority order.

In some aspects, the computer-readable medium code for causing the first wireless communication device to select the first AUL resource based on the priority order. The code for causing the first wireless communication device to communicate the AUL communication signal is further configured to receive, from the second wireless communication device, the AUL communication signal. The code for causing the first wireless communication device to communicate the AUL communication signal is further configured to transmit, to the second wireless communication device, the AUL communication signal using the first AUL resource in one or more subbands of the plurality of subbands based on a listen-before-talk (LBT). The computer-readable medium code for causing the first wireless communication device to monitor for a subband acquisition indication from the second wireless communication device. The code for causing the first wireless communication device to monitor for the subband acquisition indication is further configured to detect a subband acquisition indication, where the code for causing the first wireless communication device to communicate the AUL communication is further configured to communicate, with the second wireless communication device, the AUL communication signal based on the detecting. The code for causing the first wireless communication device to communicate the AUL communication signal is further configured to communicate the AUL communication signal based on the first starting time offset. The code for causing the first wireless communication device to select the first starting time offset is further configured to exclude one or more starting time offsets of the first set of starting time offsets based on the detecting. The code for causing the first wireless communication device to select the first starting time offset is further configured to identify the first set of starting time offsets from multiple sets of starting time offsets based on the monitoring. The first AUL resource is in at least one of the first subband or the second subband. The first set of starting time offsets are different from the second set of starting time offsets. The code for causing the first wireless communication device to select the first starting time offset is further to select the first starting time offset based on a first random number, and where the code for causing the first wireless communication device to select the second starting time offset is further configured to select the second starting time offset based on a second random number. The first random number is different from the second random number.

Further embodiments of the present disclosure include an apparatus including means for identifying a first configuration from a plurality of configurations for mapping an uplink resource indicator to resources in a plurality of subbands. The apparatus may also include means for communicating, with a wireless communication device, a subband priority configuration. The apparatus may also include means for communicating, with the wireless communication device, the uplink resource indicator. The apparatus may also include means for communicating, with the wireless communication device, an uplink communication signal using a first resource of the resources based on the uplink resource indicator, the subband priority configuration, and the first configuration.

In some aspects, the apparatus may also include where the uplink resource indicator is an acknowledgement resource indicator (ARI), and where the means for communicating the uplink communication signal is further configured to communicate, with the wireless communication device, an acknowledgement/not-acknowledgement (ACK/NACK) feedback using the first resource. The means for communicating the uplink communication signal is further configured to transmitting, to the wireless communication device, the uplink communication signal in a first subband of the plurality of subbands. The means for identifying is further configured to identify the first configuration based on whether the uplink communication signal is to be transmitted within a transmission opportunity (TXOP) of the wireless communication device or outside a TXOP of the wireless communication device. The means for communicating the uplink communication signal is further configured to receive, from the wireless communication device, the uplink communication signal. The apparatus may also include means for communicating, with the wireless communication device, a message indicating a rule for identifying the first configuration from the plurality of configurations. The apparatus may also include means for communicating, with the wireless communication device, a message indicating the first configuration. The first configuration indicates that the uplink resource indicator includes a set of bits identifying a resource in a subset of the resources in the plurality of subbands, and where the first resource corresponds to the identified resource. The means for communicating the uplink resource indicator is further configured to communicate, with the wireless communication device, the uplink resource indicator in a first subband of the plurality of subbands, where the first configuration indicates that the uplink resource indicator includes a set of bits identifying a resource within the first subband used for communicating the uplink resource indicator, and where the first resource corresponds to the identified resource. The first configuration indicates that the uplink resource indicator includes a first set of bits identifying a first subband of the plurality of subbands; and a second set of bits identifying a resource within the first subband, and where the first resource corresponds to the identified resource within the first subband. The first configuration further indicates that the uplink resource indicator includes a set of bits identifying a resource within a subband of the plurality of subbands and that the identified resource is repeated in each subband of the plurality of subbands, and where the first resource corresponds to the identified resource in a first subband of the plurality of subbands. The first configuration indicates that the uplink resource indicator includes a first set of bits identifying at least a first subband and a second subband of the plurality of subbands; and a second set of bits identifying a resource in the first subband and a resource in the second subband, and where the first resource corresponds to the identified resource in the first subband. The first configuration indicates that the uplink resource indicator includes a set of bits identifying a resource within the first subband and repeated in the second subband, and where the first resource corresponds to the identified resource in the first subband. The means for communicating the uplink resource indicator is further configured to communicate, with the wireless communication device, a downlink control information (DCI) message including the uplink resource indicator. The means for communicating the uplink communication signal is further configured to transmit, to the wireless communication device, the uplink communication signal using the first resource in a first subband of the plurality of subbands based on a listen-before-talk (LBT) in the plurality of subbands. The apparatus may also include means for monitoring for a subband acquisition indication from the wireless communication device in the plurality of subbands; and means for determine whether to perform the LBT in a category 2 LBT mode or a category 4 LBT mode based on whether a subband acquisition indication message is received from the wireless communication device. The uplink resource indicator indicates at least the first resource in the first subband and a second resource in a second subband of the plurality of subbands based on the first configuration, and where the means for transmitting the uplink communication signal in the first subband is further configured to transmit the uplink communication signal based on a priority order of the first subband and the second subband. The priority order is based on at least one of the subband priority configuration or a subband acquisition indication status in each subband of the plurality of subbands determined from the monitoring. The apparatus may also include and the wireless communication device are located within a cell, and where the subband priority configuration is based on a cell index of the cell.

Further embodiments of the present disclosure include an apparatus including means for communicating, with a wireless communication device, a configuration for a plurality of autonomous uplink (AUL) resources in a plurality of subbands and a priority order associated with the plurality of AUL resources; and means for communicating, with the wireless communication device, an AUL communication signal using a first AUL resource of the plurality of AUL resources based at least in part on the priority order.

In some aspects, the apparatus may also include means for selecting the first AUL resource based on the priority order. The means for communicating the AUL communication signal is further configured to receive, from the wireless communication device, the AUL communication signal. The means for communicating the AUL communication signal is further configured to transmit, to the wireless communication device, the AUL communication signal using the first AUL resource in one or more subbands of the plurality of subbands based on a listen-before-talk (LBT). The apparatus may also include means for monitoring for a subband acquisition indication from the wireless communication device. The means for monitoring for the subband acquisition indication is further configured to detect a subband acquisition indication, where the means for communicating the AUL communication is further configured to communicate, with the wireless communication device, the AUL communication signal based on the detecting. The means for communicating the AUL communication signal is further configured to communicate the AUL communication signal based on the first starting time offset. The means for selecting the first starting time offset is further configured to exclude one or more starting time offsets of the first set of starting time offsets based on the detecting. The means for selecting the first starting time offset is further configured to identify the first set of starting time offsets from multiple sets of starting time offsets based on the monitoring. The first AUL resource is in at least one of the first subband or the second subband. The first set of starting time offsets are different from the second set of starting time offsets. The means for selecting the first starting time offset is further to select the first starting time offset based on a first random number, and where the means for selecting the second starting time offset is further configured to select the second starting time offset based on a second random number. The first random number is different from the second random number.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a configuration for a plurality of autonomous uplink (AUL) resources in a plurality of subbands and a priority order associated with the plurality of AUL resources;
monitoring, by the first wireless communication device, for a subband acquisition indication from the second wireless communication device; and
communicating, by the first wireless communication device with the second wireless communication device, an AUL data communication signal using a first AUL resource of the plurality of AUL resources based at least in part on: the priority order, whether the subband acquisition indication is received from the second wireless communication device based on the monitoring, and listen-before-talk (LBT) procedure outcomes based on a first starting time offset from a first set of starting time offsets associated with the first AUL resource.

2. The method of claim 1, further comprising:
selecting, by the first wireless communication device, the first AUL resource based on the priority order.

3. The method of claim 1, wherein the communicating the AUL data communication signal includes:
receiving, by the first wireless communication device from the second wireless communication device, the AUL data communication signal.

4. The method of claim 1, wherein the communicating the AUL data communication signal includes:
transmitting, by the first wireless communication device to the second wireless communication device, the AUL data communication signal using the first AUL resource in one or more subbands of the plurality of subbands based on a LBT procedure being successful.

5. The method of claim 1, wherein the monitoring includes:
detecting, by the first wireless communication device, the subband acquisition indication,
wherein the communicating the AUL data communication signal is further based on the detecting.

6. The method of claim 1, further comprising:
selecting, by the first wireless communication device, the first starting time offset from the first set of starting time offsets associated with the first AUL resource,
wherein the communicating the AUL data communication signal is based on the first starting time offset.

7. The method of claim 6, further comprising:
detecting, by the first wireless communication device, the subband acquisition indication from the second wireless communication device,
wherein the selecting includes:
excluding, by the first wireless communication device, one or more starting time offsets of the first set of starting time offsets based on the detecting.

8. The method of claim 6, wherein the selecting includes:
identifying, by the first wireless communication device, the first set of starting time offsets from multiple sets of starting time offsets based on the monitoring.

9. The method of claim 6, further comprising:
detecting, by the first wireless communication device, the subband acquisition indication from the second wireless communication device in a first subband of the plurality of subbands;
determining, by the first wireless communication device, that no subband acquisition indication is received from the second wireless communication device in a second subband of the plurality of subbands different from the first subband;
selecting, by the first wireless communication device, a second starting time offset from a second set of starting time offsets, the second starting time offset being earlier in time than the first starting time offset;
performing, by the first wireless communication device, a LBT procedure in the first subband based on the first starting time offset; and
performing, by the first wireless communication device, a LBT procedure in the second subband based on the first starting time offset when the second starting time offset is earlier in time than the first starting time offset,
wherein the first AUL resource is in at least one of the first subband or the second subband.

10. The method of claim 9, wherein the first set of starting time offsets are different from the second set of starting time offsets.

11. The method of claim 9, wherein the selecting the first starting time offset is further based on a first random number, and wherein the selecting the second starting time offset is further based on a second random number.

12. The method of claim 11, wherein the first random number is different from the second random number.

13. An apparatus comprising:
one or more memories;
one or more transceivers; and
one or more processors coupled to the one or more transceivers and the one or more memories, the one or more memories storing instructions that are executable by the one or more processors, individually or in any combination, to cause the apparatus to:
communicate, with a wireless communication device, a configuration for a plurality of autonomous uplink (AUL) resources in a plurality of subbands and a priority order associated with the plurality of AUL resources;
monitor for a subband acquisition indication from the wireless communication device; and
communicate, with the wireless communication device, an AUL data communication signal using a first AUL resource of the plurality of AUL resources based at least in part on: the priority order, whether the subband acquisition indication is received from the wireless communication device based on monitoring, and listen-before-talk (LBT) procedure outcomes based on a first starting time offset from a first set of starting time offsets associated with the first AUL resource.

14. The apparatus of claim 13, wherein the one or more memories further store instructions that are executable by the one or more processors, individually or in any combination, to cause the apparatus to:
select the first AUL resource based on the priority order.

15. The apparatus of claim 13, wherein the one or more memories further store instructions that are executable by the one or more processors, individually or in any combination, to cause the apparatus to:
receive, from the wireless communication device, the AUL data communication signal.

16. The apparatus of claim 13, wherein the one or more memories further store instructions that are executable by the one or more processors, individually or in any combination, to cause the apparatus to:
transmit, to the wireless communication device, the AUL data communication signal using the first AUL resource in one or more subbands of the plurality of subbands based on a LBT procedure being successful.

17. The apparatus of claim 13, wherein the one or more memories further store instructions that are executable by the one or more processors, individually or in any combination, to cause the apparatus to:
detect the subband acquisition indication, and
communicate the AUL data communication signal based on the detection.

18. The apparatus of claim 13, wherein the one or more memories further store instructions that are executable by the one or more processors, individually or in any combination, to cause the apparatus to:
select the first starting time offset from the first set of starting time offsets associated with the first AUL resource; and communicate the AUL data communication signal based on the first starting time offset.

19. The apparatus of claim 18, wherein the one or more memories further store instructions that are executable by the one or more processors, individually or in any combination, to cause the apparatus to:
   detect the subband acquisition indication from the wireless communication device; and
   select the first starting time offset by excluding one or more starting time offsets of the first set of starting time offsets based on the detection.

20. The apparatus of claim 18, wherein the one or more memories further store instructions that are executable by the one or more processors, individually or in any combination, to cause the apparatus to:
   select the first starting time offset by identifying the first set of starting time offsets from multiple sets of starting time offsets based on the monitoring.

21. The apparatus of claim 18, wherein the one or more memories further store instructions that are executable by the one or more processors, individually or in any combination, to cause the apparatus to:
   detect the subband acquisition indication from the wireless communication device in a first subband of the plurality of subbands;
   determine that no subband acquisition indication is received from the wireless communication device in a second subband of the plurality of subbands different from the first subband;
   select a second starting time offset from a second set of starting time offsets, the second starting time offset being earlier in time than the first starting time offset;
   perform a LBT procedure in the first subband based on the first starting time offset; and
   perform a LBT procedure in the second subband based on the first starting time offset when the second starting time offset is earlier in time than the first starting time offset,
   wherein the first AUL resource is in at least one of the first subband or the second subband.

22. The apparatus of claim 21, wherein the first set of starting time offsets are different from the second set of starting time offsets.

23. The apparatus of claim 21, wherein the one or more memories further store instructions that are executable by the one or more processors, individually or in any combination, to cause the apparatus to:
   select the first starting time offset based on a first random number; and
   select the second starting time offset based on a second random number.

24. The apparatus of claim 23, wherein the first random number is different from the second random number.

* * * * *